United States Patent
Makino et al.

(10) Patent No.: US 10,566,651 B2
(45) Date of Patent: Feb. 18, 2020

(54) ALL-SOLID-STATE SECONDARY BATTERY, SOLID ELECTROLYTE COMPOSITION AND ELECTRODE SHEET FOR BATTERIES USED IN THE SAME, AND MANUFACTURING METHOD OF ELECTRODE SHEET FOR BATTERIES AND ALL-SOLID-STATE SECONDARY BATTERY

(71) Applicant: FUJIFILM Corporation, Tokyo (JP)

(72) Inventors: Masaomi Makino, Kanagawa (JP); Hiroaki Mochizuki, Kanagawa (JP); Katsuhiko Meguro, Kanagawa (JP); Tomonori Mimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 725 days.

(21) Appl. No.: 15/272,631

(22) Filed: Sep. 22, 2016

(65) Prior Publication Data

US 2017/0237114 A1 Aug. 17, 2017

Related U.S. Application Data

(63) Continuation of application No. PCT/JP2015/059679, filed on Mar. 27, 2015.

(30) Foreign Application Priority Data

Mar. 28, 2014 (JP) ................. 2014-070094

(51) Int. Cl.
*H01M 10/056* (2010.01)
*H01M 10/0525* (2010.01)
(Continued)

(52) U.S. Cl.
CPC ............ *H01M 10/056* (2013.01); *H01B 1/08* (2013.01); *H01M 4/13* (2013.01); *H01M 4/139* (2013.01);
(Continued)

(58) Field of Classification Search
CPC ...... H01M 10/056; H01M 4/13; H01M 4/139; H01M 10/0525; H01B 1/08; H01B 1/122; Y02T 10/7011
See application file for complete search history.

(56) References Cited

U.S. PATENT DOCUMENTS 4,303,748 A 12/1981 Armand et al.
5,190,695 A 3/1993 Sotomura
(Continued)

FOREIGN PATENT DOCUMENTS

JP 55-098480 A 7/1980
JP 04-033250 A 2/1992
(Continued)

OTHER PUBLICATIONS

Partial Human Translation of JP 2010-192258 A (U.S. Appl. No. 15/272,631) (Year: 2010).*
(Continued)

*Primary Examiner* — Stewart A Fraser
(74) *Attorney, Agent, or Firm* — Sughrue Mion, PLLC

(57) ABSTRACT

An all-solid-state secondary battery includes: a positive electrode active substance layer; a negative electrode active substance layer; and a solid electrolyte layer, in which at least one layer of the positive electrode active substance layer, the negative electrode active substance layer, or the solid electrolyte layer contains a nitrogen-containing polymer having a repeating unit having at least one of a substituent X, a substituent Y, or a substituent Z and an inorganic solid electrolyte having conductivity of ions of metal belonging to Group 1 or 2 in the periodic table.

20 Claims, 1 Drawing Sheet

(51) Int. Cl.
*H01M 4/13* (2010.01)
*H01M 4/139* (2010.01)
*H01B 1/08* (2006.01)
*H01B 1/12* (2006.01)

(52) U.S. Cl.
CPC ......... *H01M 10/0525* (2013.01); *H01B 1/122* (2013.01); *H01M 2300/0068* (2013.01); *H01M 2300/0071* (2013.01); *H01M 2300/0082* (2013.01); *H01M 2300/0091* (2013.01); *Y02T 10/7011* (2013.01)

(56) References Cited

U.S. PATENT DOCUMENTS

2002/0160271 A1 10/2002 Frech et al.
2008/0268346 A1* 10/2008 Inda .................. H01M 4/131
429/322

FOREIGN PATENT DOCUMENTS

| JP | 04-033263 A | 2/1992 | |
|---|---|---|---|
| JP | 2002-358822 A | 12/2002 | |
| JP | 2004-525204 A | 8/2004 | |
| JP | 2010-192258 A | 9/2010 | |
| JP | 2010192258 A * | 9/2010 | ........ H01M 10/0525 |
| JP | 2011-134675 A | 7/2011 | |
| JP | 2013-008611 A | 1/2013 | |

OTHER PUBLICATIONS

Molecular Biology Web-Book, Chapter 2: Protein Structure and Function, pH and pKa, 2019 (Year: 2019).*
International Search Report for PCT/JP2015/059679 dated Jun. 30, 2015 [PCT/ISA/210].

* cited by examiner

ALL-SOLID-STATE SECONDARY BATTERY, SOLID ELECTROLYTE COMPOSITION AND ELECTRODE SHEET FOR BATTERIES USED IN THE SAME, AND MANUFACTURING METHOD OF ELECTRODE SHEET FOR BATTERIES AND ALL-SOLID-STATE SECONDARY BATTERY

CROSS-REFERENCE TO RELATED APPLICATIONS

This application is a Continuation of PCT International Application No. PCT/JP2015/059679 filed on Mar. 27, 2015, which claims priority under 35 U.S.C. § 119 (a) to Japanese Patent Application No. 2014-070094 filed in Japan on Mar. 28, 2014. Each of the above applications is hereby expressly incorporated by reference, in its entirety, into the present application.

BACKGROUND OF THE INVENTION

1. Field of the Invention

The invention relates to an all-solid-state secondary battery, a solid electrolyte composition and an electrode sheet for batteries used in the same, and manufacturing methods for an electrode sheet for batteries and an all-solid-state secondary battery.

2. Description of the Related Art

An electrolyte solution is used in lithium ion batteries which are currently widely used in many cases. There have been attempts to make all configuration materials be solid by substituting the electrolyte solution with a solid electrolyte. Above all, one of the advantages of the technique of using an inorganic solid electrolyte is reliability and stability during use. In the electrolyte solution which is used in a lithium ion secondary battery, a combustible material such as a carbonate-based solvent is applied as a medium thereof. Various countermeasures are employed, but an additional countermeasure to be performed when a battery is overcharged is desired. An all-solid-state secondary battery formed of inorganic compounds that allows an electrolyte to be incombustible is regarded as fundamental solving means thereof. Another advantage is that an inorganic solid electrolyte exhibits higher ion conductivity than a polymer electrolyte.

Another advantage of the all-solid-state secondary battery is that a high energy density is suitably achieved by stacking electrodes. Specifically, the all-solid-state secondary battery can be a battery having a structure in which electrodes and electrolytes are directly arranged side by side to be serialized. At this point, a metal package that seals battery cells and copper wire or bus bars that connect battery cells can be omitted, and thus energy density of the battery can be greatly increased. It is advantageous that compatibility with a positive electrode material in which a potential can be enhanced to a high level is good.

According to the respective advantages as described above, the development of an all-solid-state secondary battery as a next-generation lithium ion secondary battery has been energetically advanced (see NEDO: New Energy and Industrial Technology Development Organization, Fuel Cells-Hydrogen Technology Development Field, Electricity Storage Technology Development Division "NEDO 2013 Roadmap for the Development of Secondary Battery Technology" (August 2013)). Meanwhile, an inorganic all-solid-state secondary battery has disadvantages caused by the fact that the electrolyte thereof is a hard solid. Examples thereof include increase of resistance on an interface between solid particles. In order to solve this problem, there are examples in which specific polymer compounds are used as binders. Specifically, in JP2013-008611A, a surfactant utilizing a polyoxyethylene chain is used. JP2011-134675A discloses the use of a hydrogenated butadiene copolymer. Otherwise, in JP1992-033263A (JP-H04-033263A), although whether an all-solid-state secondary battery is used is not clear, the application of an amide compound of polyalkyleneimine-fatty acid to an electrode material is exemplified.

SUMMARY OF THE INVENTION

According to the techniques of JP2013-008611A, JP2011-134675A, and JP19924-033263A (JP-H04-033263A), the increase of the interface resistance or heat resistance in an all-solid-state secondary battery may be somewhat ameliorated. However, the binders consisting of polymer compounds disclosed in the documents above may not meet currently required high standards and new improvements therein are required.

Therefore, an object of the invention is to provide an all-solid-state secondary battery, in which high ion conductivity is realized regardless of the pressurization between the active substance layer and the inorganic solid electrolyte layer, and more suitable binding properties of a material and, if necessary, temporal stability at the time of manufacturing are realized, a solid electrolyte composition and an electrode sheet for batteries using the same, and manufacturing methods for an electrode sheet for batteries and an all-solid-state secondary battery.

The problems described above are solved by the means below.

[1] An all-solid-state secondary battery comprising: a positive electrode active substance layer; a negative electrode active substance layer; and an inorganic solid electrolyte layer, in which at least one layer of the positive electrode active substance layer, the negative electrode active substance layer, or the inorganic solid electrolyte layer contains a nitrogen-containing polymer having a repeating unit having at least one of a substituent X, a substituent Y, or a substituent Z described below and an inorganic solid electrolyte having conductivity of ions of metal belonging to Group 1 or 2 in the periodic table.

X represents a group containing a functional group having pKa of 14 or less.

Y represents a group having a polymer chain including a hetero atom. Y may be linked to another nitrogen-containing polymer molecule to form a linking chain.

Z represents a hydrogen atom forming —NH— by being bonded to a nitrogen atom, a group having an alkyl group having 1 to 30 carbon atoms, a group having a halogenated alkyl group having 1 to 30 carbon atoms, or a group having a silicone chain having 1 to 100 silicon atoms.

[2] The all-solid-state secondary battery according to [1], in which the nitrogen-containing polymer has a repeating unit represented by any one of Formulae (1-1) to (1-3) and (2-1) to (2-3) below,

(1-1)

-continued

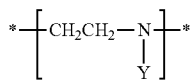
(1-2)

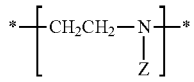
(1-3)

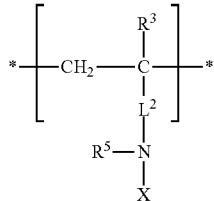
(2-1)

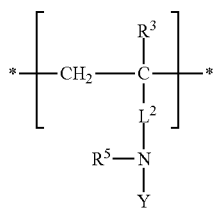
(2-2)

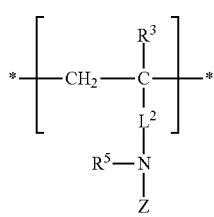
(2-3)

$R^3$ represents a hydrogen atom, a halogen atom, or an alkyl group.

$R^5$ represents a hydrogen atom or an alkyl group.

$L^2$ represents a single bond, an alkylene group, CO, O, or a combination thereof.

X, Y, and Z have the same meaning as above.

* represents a linking portion between repeating units.

[3] The all-solid-state secondary battery according to [1] or [2], in which Z has a structure represented by #-$L^R$-$(L^1)_p$-$Z^1$.

# represents a site at which a nitrogen atom included in a base portion of the nitrogen-containing polymer is bonded.

$L^R$ represents an alkylene group having 1 to 12 carbon atoms.

$L^1$ represents CO, $NR^N$, O, or a combination thereof. p represents 0 or 1.

$R^N$ represents a hydrogen atom or a substituent.

$Z^1$ represents an alkyl group having 1 to 30 carbon atoms, a halogenated alkyl group having 1 to 30 carbon atoms, or a silicone chain having 1 to 100 silicon atoms.

[4] The all-solid-state secondary battery according to any one of [1] to [3], in which the substituent X is a group having a functional group selected from a carboxyl group, a sulfonic acid group, a phosphoric acid group, and —$COCH_2CO$—.

[5] The all-solid-state secondary battery according to any one of [1] to [4], in which a number average molecular weight of the substituent Y is 500 to 1,000,000.

[6] The all-solid-state secondary battery according to [2], in which the nitrogen-containing polymer includes repeating units in any one of the combinations below:

A repeating unit of Formula (1-1) and a repeating unit of Formula (1-2)

A repeating unit of Formula (1-1) and a repeating unit of Formula (1-3)

A repeating unit of Formula (1-2) and a repeating unit of Formula (1-3)

A repeating unit of Formula (2-1) and a repeating unit of Formula (2-2)

A repeating unit of Formula (2-1) and a repeating unit of Formula (2-3)

A repeating unit of Formula (2-2) and a repeating unit of Formula (2-3)

[7] The all-solid-state secondary battery according to [2], in which a repeating unit represented by Formula (1-2) above is represented by Formula (1-2I) or (1-2II) below.

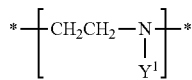
(1-2I)

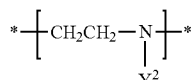
(1-2II)

In the formulae, * represents a linking portion between repeating units, $Y^1$ represents a univalent group having a number average molecular weight of 500 to 1,000,000 and having a polyester chain, a polyamide chain, a polyimide chain, a polyacryl chain, a polyether chain, or a polycarbonate chain, and $Y^2$ represents a divalent group having a number average molecular weight of 500 to 1,000,000 and having a polyester chain, polyamide chain, a polyimide chain, a polyacryl chain, a polyether chain, or a polycarbonate chain.

[8] The all-solid-state secondary battery according to [2], in which the repeating unit represented by Formula (2-2) above is represented by Formula (2-2I) or (2-2II) below.

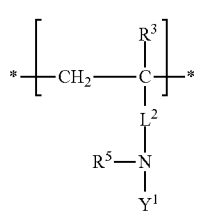
(2-2I)

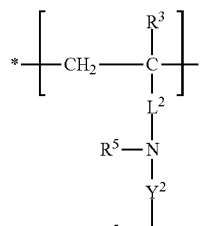
(2-2II)

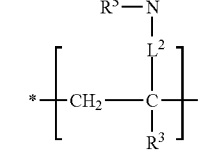

In the formulae, $R^3$, $R^5$, and $L^2$ represent groups which are the same as above. $Y^1$ represents a univalent group having a number average molecular weight of 500 to 1,000,000 and having a polyester chain, a polyamide chain, a polyimide chain, a polyacryl chain, a polyether chain, or a polycarbonate chain. $Y^2$ represents a divalent group having a number average molecular weight of 500 to 1,000,000 and having a polyester chain, a polyamide chain, a polyimide chain, a polyacryl chain, a polyether chain, or a polycarbonate chain.

[9] The all-solid-state secondary battery according to [7] or [8], in which $Y^1$ above is represented by formulae below.

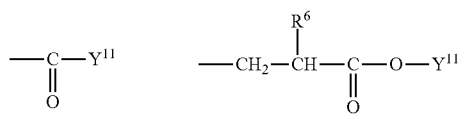

$Y^{11}$ represents any one of a univalent polyether chain, a univalent polyester chain, a univalent polycarbonate chain, and a univalent polyacryl chain. $R^6$ represents a hydrogen atom or a methyl group.

[10] The all-solid-state secondary battery according to [7] or [8], in which $Y^2$ above is represented by formulae below.

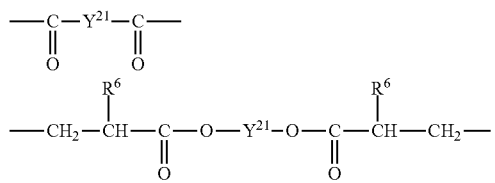

$Y^{21}$ represents any one of a divalent polyether chain, a divalent polyester chain, a divalent polycarbonate chain, and a divalent polyacryl chain. $R^6$ represents a hydrogen atom or a methyl group.

[11] The all-solid-state secondary battery according to any one of [1] to [10], in which the positive electrode active substance layer, the negative electrode active substance layer, or the inorganic solid electrolyte layer further contains a lithium salt.

[12] The all-solid-state secondary battery according to any one of [1] to [11], in which the inorganic solid electrolyte is an oxide-based inorganic solid electrolyte.

[13] The all-solid-state secondary battery according to [12], in which the inorganic solid electrolyte is selected from compounds of formulae below:

$Li_{xa}La_{ya}TiO_3$ 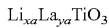

xa=0.3 to 0.7, ya=0.3 to 0.7

$Li_7La_3Zr_2O_{12}$ 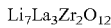

$Li_{3.5}Zn_{0.25}GeO_4$ 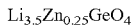

$LiTi_2P_3O_{12}$ 

$Li_{1+xh+yh}(Al,Ga)_{xh}(Ti,Ge)_{2-xh}Si_{yh}P_{3-yh}O_{12}$ 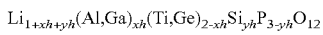

$0 \leq xh \leq 1$, $0 \leq yh \leq 1$ $Li_3PO_4$ 

LiPON 

$LiPOD^1$ 

$D^1$ is at least one selected from Ti, V, Cr, Mn, Fe, Co, Ni, Cu, Zr, Nb, Mo, Ru, Ag, Ta, W, Pt, or Au $LiA^1ON$ 

$A^1$ is at least one selected from Si, B, Ge, Al, C, or Ga

[14] A solid electrolyte composition for an inorganic solid electrolyte, comprising: a nitrogen-containing polymer having a repeating unit having at least one of a substituent X, a substituent Y, or a substituent Z described below and an inorganic solid electrolyte having conductivity of ions of metal belonging to Group 1 or 2 in the periodic table.

X represents a group containing a functional group having pKa of 14 or less.

Y represents a group having a polymer chain including a hetero atom. Y may be linked to another nitrogen-containing polymer molecule to form a linking chain.

Z represents a hydrogen atom forming —NH— by being bonded to a nitrogen atom, a group having an alkyl group having 1 to 30 carbon atoms, a group having a halogenated alkyl group having 1 to 30 carbon atoms, or a group having a silicone chain having 1 to 100 silicon atoms.

[15] The solid electrolyte composition according to [14], in which 0.1 parts by mass to 20 parts by mass of a nitrogen-containing polymer is contained with respect to 100 parts by mass of the inorganic solid electrolyte.

[16] An electrode sheet for batteries, in which a film is formed with the solid electrolyte composition according to [14] or [15], on a metal foil.

[17] A manufacturing method of an electrode sheet for batteries, comprising: forming a film with the solid electrolyte composition according to [14] or [15], on a metal foil.

[18] A manufacturing method of an all-solid-state secondary battery, comprising: manufacturing an all-solid-state secondary battery by the manufacturing method according to [17].

In this specification, when there are plural substituents or linking groups indicated with specific reference symbols, or plural substituents or the like (in the same manner as in the definition of the number of substituents) are simultaneously or alternatively defined, the respective substituents may be identical to or different from each other. When the plural substituents and the like are in vicinity to each other, those may be bonded or condensed to each other to form a ring.

The all-solid-state secondary battery according to the invention realizes high ion conductivity regardless of the pressurization between the active substance layer and the inorganic solid electrolyte layer, and further realizes suitable binding properties of a material and, if necessary, temporal stability at the time of manufacturing.

If the solid electrolyte composition, the electrode sheet for batteries, and the manufacturing method of the electrode sheet for batteries and the all-solid-state secondary battery of the invention are used, the electrode sheet for batteries and the all-solid-state secondary battery can be suitably manufactured.

Aforementioned and additional features and advantages are clearly presented from the following descriptions suitably referring to the accompanying drawings.

DESCRIPTION OF THE PREFERRED EMBODIMENTS

The all-solid-state secondary battery according to the invention include a positive electrode active substance layer, a negative electrode active substance layer, and an inorganic solid electrolyte layer, and any one of the layers contains an inorganic solid electrolyte having ion conductivity and a specific nitrogen-containing polymer. Hereinafter, preferred embodiments are described with reference to the drawings. In this specification, the "solid electrolyte composition" means a composition including an inorganic solid electrolyte.

Figure 1:
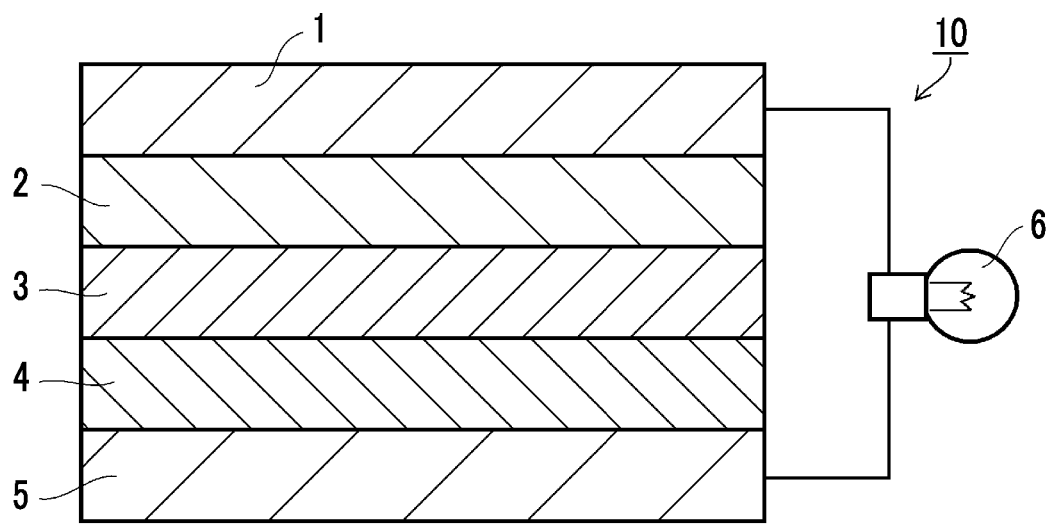
FIG. 1 is a cross-sectional view schematically illustrating an all-solid-state lithium ion secondary battery according to a preferred embodiment of the invention.

FIG. 1 is a sectional view schematically illustrating an all-solid-state secondary battery (lithium ion secondary battery) according to a preferred embodiment of the invention. An all-solid-state secondary battery 10 according to the embodiment includes a negative electrode collector 1, a negative electrode active substance layer 2, an inorganic solid electrolyte layer 3, a positive electrode active substance layer 4, and a positive electrode collector 5, in this sequence, from the negative electrode side. The respective layers are in contact with each other, and form a laminate structure. If this structure is employed, when the battery is charged, electrons (e⁻) are supplied to a negative electrode side and lithium ions (Li⁺) are accumulated thereto. Meanwhile, when the battery is discharged, the lithium ions (L⁺) accumulated in the negative electrode are returned to the positive electrode side, and electrons are supplied to an operating site 6. In the illustrated example, a bulb is employed in the operating site 6, and the bulb is turned on by the discharge. The solid electrolyte composition according to the invention is preferably used as a configuration material of the negative electrode active substance layer, the positive electrode active substance layer, and the inorganic solid electrolyte layer. Among them, the inorganic solid electrolyte composition according to the invention is preferably used as a configuration material of all of the inorganic solid electrolyte layer, the positive electrode active substance layer, and the negative electrode active substance layer. The positive electrode active substance layer and the negative electrode active substance layer are collectively referred to as "active substance layers". The inorganic solid electrolyte layer may be referred to as a "solid electrolyte layer" or an "electrode layer".

The thicknesses of the positive electrode active substance layer 4 and the negative electrode active substance layer 2 can be determined according to desired battery capacity. If dimensions of a general element is considered, the thickness is preferably 1 µm or greater and more preferably 3 µm. The upper limit thereof is preferably 1,000 µm or less and more preferably 400 µm or less.

Meanwhile, it is desirable that the inorganic solid electrolyte layer 3 is as thin as possible, while a short circuit of positive and negative electrodes is prevented. It is preferable to prominently exhibit the effect of the invention, and specifically, the thickness is preferably 1 µm or greater and more preferably 3 µm. The upper limit thereof is preferably 1,000 µm or less and more preferably 400 µm or less.

In FIG. 1, as described above, a laminate consisting of the collector, the active substance layer, and the solid electrolyte layer are referred to as an "all-solid-state secondary battery". However, in order to make the laminate into a product, this laminate is stored in a housing (case) as a secondary electrode sheet for batteries, to be an all-solid-state secondary battery (for example, a coin battery or laminate battery).

<Solid Electrolyte Composition>

(Inorganic Solid Electrolyte)

The inorganic solid electrolyte is an inorganic solid electrolyte. In this specification, a solid electrolyte means a solid-state electrolyte of which ions can move inside. In this point of view, considering the distinction from electrolyte salt (a supporting electrolyte), the inorganic solid electrolyte may be called an ion conductive inorganic solid electrolyte. The ion conductivity of the inorganic solid electrolyte is not particularly limited. With respect to the lithium ion, the ion conductivity is preferably $1 \times 10^{-6}$ S/cm or greater, more preferably $1 \times 10^{-5}$ S/cm or greater, even more preferably $1 \times 10^{-4}$ S/cm or greater, and particularly preferably $1 \times 10^{-3}$ S/cm or greater. The upper limit thereof is not particularly limited, but 1 S/cm or less is practical. Unless described otherwise, the measuring method of the ion conductivity is performed under non-pressurized condition measured in examples below.

The inorganic solid electrolyte is clearly differentiated from an organic solid electrolyte (a polymer electrolyte represented by PEO or the like, an organic electrolyte salt represented by LiTFSI or the like), since a polymer compound or an organic product such as complex salt is not included. Since the inorganic solid electrolyte is a non-dissociative solid in a normal state, cations and anions are not decomposed or separated even in the liquid. In this point of view, the inorganic solid electrolyte is clearly differentiated from inorganic electrolyte salt ($LiPF_6$, $LiBF_4$, LiFSI, LiCl, or the like) in which cations and anions are decomposed or separated in the electrolysis liquid or the polymer. It is general that, the inorganic solid electrolyte has conductivity of ions of metal belonging to Group 1 or 2 of the periodic table (preferably lithium ions) but does not have electron conductivity.

According to the invention, an inorganic solid electrolyte of the conductivity of ions (preferably, a lithium ion) of metal belonging to Group 1 or 2 in the periodic table is contained in the electrolyte layer or the active substance layer. As the inorganic solid electrolyte, a solid electrolyte material that is applied to this kind of product can be appropriately selected to be used. Representative examples of the inorganic solid electrolyte include (i) a sulfide-based inorganic solid electrolyte (also referred to as a sulfide solid electrolyte) and an (ii) oxide-based inorganic solid electrolyte (also referred to as an oxide solid electrolyte).

(i) Sulfide-Based Inorganic Solid Electrolyte

It is preferable that the sulfide-based solid electrolyte contains a sulfur atom (S), has ion conductivity of metal belonging to Group 1 or 2 in the periodic table, and has electron insulation properties. Examples thereof include a lithium ion conductive inorganic solid electrolyte satisfying the composition presented in Formula (1) below.

$$L_{a1}M_{b1}P_{c1}S_{d1}A_{e1} \qquad (1)$$

(In the formula, L represents an element selected from Li, Na, and K, and Li is preferable. M represents an element selected from B, Zn, Sn, Si, Cu, Ga, Sb, Al, and Ge. Among these, B, Sn, Si, Al, and Ge are preferable, and Sn, Al, and Ge are more preferable. A represents I, Br, Cl, and F, and I and Br are preferable, and I is particularly preferable, a1 to e1 represent compositional ratios of respective elements, and a1:b1:c1:d1:e1 satisfies 1 to 12:0 to 1:1:2 to 12:0 to 5. a1 is preferably 1 to 9 and more preferably 1.5 to 4. b1 is preferably 0 to 0.5. d1 is preferably 3 to 7 and more preferably 3.25 to 4.5. e1 is preferably 0 to 3 and more preferably 0 to 1.)

In Formula (1), with respect to the compositional ratios of L, M, P, S, and A, it is preferable that b1 and e1 are 0, it is more preferable that b1=0, e1=0, and a ratio of a1, c1, and d1 (a1:c1:d1) is a1:c1:d1=1 to 9:1:3 to 7, and it is even more preferable that b1=0, e1=0, and a1:c1:d1=1.5 to 4:1:3.25 to 4.5. As described below, the compositional ratios of the respect elements can be controlled by adjusting formulation amounts of raw material compounds when the sulfide-based solid electrolyte is manufactured.

The sulfide-based solid electrolyte may be amorphous (glass) or may be crystallized (formed into glass ceramic), or a portion thereof may be crystallized.

In Li—P—S-based glass and Li—P—S-based glass ceramics, the ratio of $Li_2S$ and $P_2S_5$ is preferably 65:35 to 85:15 and more preferably 68:32 to 75:25 in the molar ratio of $Li_2S:P_2S_5$. If the ratio of $Li_2S$ and $P_2S_5$ is in the range described above, lithium ion conductivity can be increased. Specifically, the lithium ion conductivity can be preferably $1\times10^{-4}$ S/cm or greater and more preferably $1\times10^{-3}$ S/cm or greater. The upper limit thereof is not particularly limited, but $1\times10^{-1}$ S/cm or less is practical.

For example, specific examples of the compound include compounds obtained by using raw material compositions containing $Li_2S$ and sulfide of elements of Groups 13 to 15. Specific examples thereof include $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. Among these, crystalline and amorphous raw material compositions consisting of $Li_2S$—$P_2S_5$, $Li_2S$—$GeS_2$—$Ga_2S_3$, $Li_2S$—LiI—$P_2S_5$, $Li_2S$—LiI—$Li_2O$—$P_2S_5$, $Li_2S$—$SiS_2$—$P_2S_5$, $Li_2S$—$SiS_2$—$Li_4SiO_4$, $Li_2S$—$SiS_2$—$Li_3PO_4$, $Li_2S$—$Li_3PO_4$—$P_2S_5$, $Li_2S$—$GeS_2$—$P_2S_5$, and $Li_{10}GeP_2S_{12}$ are preferable, since the compositions have high lithium ion conductivity. Examples of the method of synthesizing the sulfide solid electrolyte material by using such a raw material composition include an amorphization method. Examples of the amorphization method include a mechanical milling method and a melt quenching method. Among these, a mechanical milling method is preferable. This is because a treatment in room temperature becomes possible so as to achieve simplification of a manufacturing step.

The sulfide solid electrolyte is more preferably represented by Formula (2) below.

$Li_lP_mS_n$      Formula (2)

In the formula, 1 to n represent compositional ratios of the respective elements, and l:m:n satisfies 2 to 4:1:3 to 10.

(ii) Oxide-Based Inorganic Solid Electrolyte

It is preferable that the oxide-based inorganic solid electrolyte contains oxygen (O), has ion conductivity of metal belonging to Group 1 or 2 in the periodic table, and has electron insulation properties.

For example, specific examples of the compound include $Li_{xa}La_{ya}TiO_3$ [xa=0.3 to 0.7, ya=0.3 to 0.7] (LLT), $Li_{xb}La_{yb}Zr_{zb}M^{bb}{}_{mb}O_{nb}$ ($M^{bb}$ is at least one element of Al, Mg, Ca, Sr, V, Nb, Ta, Ti, Ge, In, or Sn, xb satisfies 5≤xb≤10, yb satisfies 1≤yb≤4, zb satisfies 1≤zb≤4, mb satisfies 0≤mb≤2, and nb satisfies 5≤nb≤20), $Li_{xc}B_{yc}M^{cc}{}_{zc}O_{nc}$ ($M^{cc}$ is at least one element of C, S, Al, Si, Ga, Ge, In, or Sn, xc satisfies 0≤xc≤5, yc satisfies 0≤yc≤1, zc satisfies 0≤zc≤1, and nc satisfies 0≤nc≤6), $Li_{xd}(Al,Ga)_{yd}(Ti,Ge)_{zd}Si_{ad}P_{md}O_{nd}$ (here, 1≤xd≤3, 0≤yd≤1, 0≤zd≤2, 0≤ad≤1, 1≤md≤7, and 3≤nd≤13), $Li_{(3-2xe)}M^{ee}{}_{xe}D^{ee}O$ (xe represents a number of 0 to 0.1, $M^{ee}$ represents a divalent metal atom, $D^{ee}$ represents a halogen atom or a combination of two or more halogen atoms), $Li_{xf}Si_{yf}O_{zf}$ (1≤xf≤5, 0≤yf≤3, and 1≤zf≤10), $Li_{xg}S_{yg}O_{zg}$ (1≤xg≤3, 0≤yg≤2, and 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w<1), $Li_{3.5}Zn_{0.25}GeO_4$ having a lithium super ionic conductor (LISICON)-type crystal structure, $La_{0.55}Li_{0.35}TiO_3$ having a perovskite-type crystal structure, $LiTi_2P_3O_{12}$ having a natrium super ionic conductor (NASICON)-type crystal structure, $Li_{1+xh+yh}(Al,Ga)_{xh}(Ti,Ge)_{2-xh}-Si_{yh}P_{3-yh}O_{12}$ (here, 0≤xh≤1, and 0≤yh≤1), and $Li_7La_3Zr_2O_{12}$ having a garnet-type crystal structure. A phosphorus compound including Li, P, and O is desirable. Examples thereof include lithium phosphate ($Li_3PO_4$), LiPON in which a portion of oxygen of lithium phosphate is substituted with nitrogen, $LiPOD^1$ ($D^1$ is at least one selected from Ti, V, Cr, Mn, Fe, Co, Ni, Cu, Zr, Nb, Mo, Ru, Ag, Ta, W, Pt, Au, or the like). $LiA^1ON$ ($A^1$ is at least one selected from Si, B, Ge, Al, C, Ga, or the like) or the like can be preferably used.

Among these, $Li_{xa}La_{ya}TiO_3$ [xa=0.3 to 0.7, ya=0.3 to 0.7] (LLT), $Li_{xb}La_{yb}Zr_{zb}M^{bb}{}_{mb}O_{nb}$ ($M^{bb}$ is at least one element of Al, Mg, Ca, Sr, V, Nb, Ta, Ti, Ge, In, or Sn, xb satisfies 5≤xb≤10, yb satisfies 1≤yb≤4, zb satisfies 1≤zb≤4, mb satisfies 0≤mb≤2, and nb satisfies 5≤nb≤20), $Li_7La_3Zr_2O_{12}$ (LLZ), $Li_3BO_3$, $Li_3BO_3$—$Li_2SO_4$, and $Li_{xd}(Al,Ga)_{yd}(Ti,Ge)_{zd}Si_{ad}P_{md}O_{nd}$ (here, 1≤xd≤3, 0≤yd≤1, 0≤zd≤2, 0≤ad≤1, 1≤md≤7, and 3≤nd≤13) are preferable. These may be used singly or two or more types thereof may be used in combination.

The ion conductivity as the oxide-based inorganic solid electrolyte having lithium ion conductivity is preferably $1\times10^{-6}$ S/cm or greater, more preferably $1-10^{-5}$ S/cm or greater, and particularly preferably $5\times10^{-5}$/cm or greater.

According to the invention, among these, an oxide-based inorganic solid electrolyte is preferably used. Since the oxide-based inorganic solid electrolyte generally has high hardness, the interface resistance easily increases in an all-solid-state secondary battery. If the invention is applied, the effects thereof become prominent. Particularly, it is assumed that the oxide-based inorganic solid electrolyte and a nitrogen-containing polymer described below work so as to form a more suitable adsorption state. In this point of view, an oxide-based inorganic solid electrolyte is particularly preferably used.

The inorganic solid electrolyte may be used singly or two or more types thereof may be used in combination.

The average particle diameter of the inorganic solid electrolyte is not particularly limited, but the average particle diameter is preferably 0.01 µm or longer and more preferably 0.1 µm or longer. The upper limit thereof is preferably 100 µm or shorter and more preferably 50 µm or shorter.

When compatibility between battery performances and a decrease and maintenance effect of the interface resistance is considered, the concentration of the inorganic solid electrolyte in the solid electrolyte composition is preferably 50 mass % or more, more preferably 70 mass % or more, and particularly preferably 90 mass % or more with respect to 100 mass % of the solid component. In the same point of view, the upper limit of the concentration is preferably 99.9 mass % or less, more preferably 99.5 mass % or less, and particularly preferably 99 mass % or less. However, when the inorganic solid electrolyte is used together with the positive electrode active substance or the negative electrode active substance described below, it is preferable that the sum thereof is in the concentration range described above.

<Nitrogen-Containing Polymer>

According to the invention, a nitrogen-containing polymer having a repeating unit having at least one of a substituent X, a substituent Y, or a substituent Z is used.

X represents a group containing a functional group having pKa of 14 or less.

Y represents a group having a polymer chain including a hetero atom. Y may be linked to another nitrogen-containing polymer molecule to constitute a linking chain.

Z represents a hydrogen atom that is bonded to a nitrogen atom to form —NH—, a group having an alkyl group having 1 to 30 carbon atoms, a group having a halogenated alkyl group having 1 to 30 carbon atoms, or a group having a silicone chain having 1 to 100 silicon atoms.

Here, works of the substituents X, Y, and Z according to the invention are described as below, together with assumptions. First, typically, it is understood that the substituent X is a group having an acid group, is adsorbed to a solid electrolyte or an active substance, and has a function of increasing adhesiveness. Examples of the substituent Y include a graft chain of a long chain, and it is expected that this polymer chain shows ion conductivity. Typically, it is understood that the substituent Z is a hydrophobic group, protects a solid electrolyte or an active substance from moisture in the atmosphere, and provides preservation stability. If functions of these substituents are appropriately used or combined, the desired effect according to the invention can be exhibited. The substituents Y and Z include a chain-shaped structure having a great molecular weight, but may be referred to as substituents. According to the molecular weight, groups having the substituents X, Y, and Z may be referred to as side chains X, Y, and Z. Z is referred to as a substituent also including a hydrogen atom.

(Polymer Portion Forming Main Chain (Prepolymer))

A main chain of a nitrogen-containing polymer may be a polymer structure including a nitrogen atom, and examples thereof include polyalkyleneimine, polyalkylamine, poly(meth)acrylalkylamine, poly(meth)acrylonitrile, polyamide, polyimide, polyurea, and polyurethane. Among these, a polymer structure having an amino structure (—N<) in a main chain or a polymer structure having an amino structure (—N<) in a side chain near a main chain (for example, less than five atoms) is preferable.

At this point, a nitrogen atom included in a main chain or a nitrogen atom in a side chain in a position closest to a main chain is referred to as a nitrogen atom included in a base portion of a nitrogen-containing polymer.

A polymer that becomes a raw material constituting a main chain of a nitrogen-containing polymer is referred to as a prepolymer or a main chain prepolymer. As this prepolymer, polyethyleneimine or polyallylamine is preferable. Specific examples thereof include a polymer having a structure represented by Formula (1) or (2) below. In the formulae, $R^3$, $R^5$, and $L^2$ have the same meaning as those in Formula (2-1).

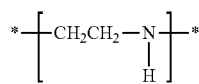
(1)

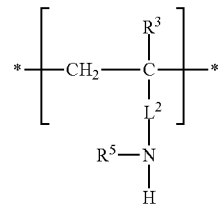
(2)

A number average molecular weight of a main chain (prepolymer) of a nitrogen-containing polymer is preferably 500 or greater, more preferably 700 or greater, and particularly preferably 1,000 or greater. The upper limit thereof is preferably 1,000,000 or less, more preferably 100,000 or less, and particularly preferably 10,000 or less. If the number average molecular weight is caused to be a molecular weight in this range, solubility of a polymer and binding properties to an active substance to an inorganic solid electrolyte can be preferably compatible with each other.

(Substituent X [Side Chain X])

The substituent X represents a group containing a functional group (functional group x) having pKa of 14 or less. pKa is preferably 10 or less, more preferably 8 or less, and particularly preferably 6 or less. The lower limit of pKa is preferably −10 or greater, more preferably −5 or greater, and particularly preferably 0 or greater. The expression "pKa" described herein is the definition disclosed in Chemical Handbook (II) (Fourth Revised Edition, 1993, edited by The Chemical Society of Japan, Maruzen). A measuring temperature is 25° C. in water temperature.

A structure of a functional group (functional group x) having pKa of 14 or less is not particularly limited, as long as physical properties thereof satisfy this condition. Specific examples thereof include a carboxyl group (pKa: about 3 to 5), a sulfonic acid group (pKa: about −3 to −2), phosphoric acid group (pKa: about 2), —COCH$_2$CO— (pKa: about 8 to 10), —COCH$_2$CN (pKa: about 8 to 11), —CONHCO—, a phenolic hydroxyl group, —R$_F$CH$_2$OH, -(R$_F$)$_2$CHOH (R$_F$ represents a perfluoroalkyl group, pKa: about 9 to 11)), and a sulfonamide group (pKa: about 9 to 11). Particularly, a carboxyl group, a sulfonic acid group, a phosphoric acid group, and —COCH$_2$CO— are preferable.

In the case where pKa is obtained by calculation, a value calculated, for example, by using ACD/Labs (manufactured by Advanced Chemistry Development, Inc.). As below, a representative calculation example of the functional group x is presented.

| Substituent | pKa |
| --- | --- |
| —COOH | 4.14 |
| —SO$_3$H | −2.80 |
| —PO$_4$H$_2$ | 2.12, (2 stage 7.06) |

The substituent X is preferably bonded to a nitrogen atom of a polymer base portion. Even if this nitrogen atom and X are bonded not only covalently but also ionically, so as to be linked in an embodiment of forming a salt, a molecular weight of the substituent X combined with the nitrogen-containing polymer is preferably 50 to 1,000 and most preferably 50 to 500. If the molecular weight is in this range, the adhesiveness becomes suitable.

Particularly, the substituent X preferably has a structure represented by Formula (V-1), (V-2), or (V-3).

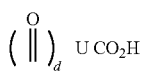  (V-1)

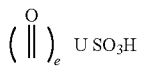  (V-2)

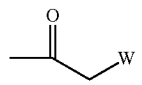  (V-3)

In the formula, U represents a single bond or a divalent linking group. Examples of a divalent linking group represented by U include an alkylene group (preferably having 1 to 12 carbon atoms, more preferably having 1 to 6 carbon atoms, and particularly preferably having 1 to 3 carbon atoms), an alkylene group (Formula OA1 described below is preferable) having an oxygen atom interposed, a cycloalkylene group (preferably having 3 to 12 carbon atoms, more preferably having 3 to 8 carbon atoms, and particularly preferably having 3 to 6 carbon atoms), an arylene group (preferably having 6 to 24 carbon atoms, more preferably having 6 to 14 carbon atoms, and particularly preferably having 6 to 10 carbon atoms), and an alkyleneoxy group (for example, ethyleneoxy, propyleneoxy, and phenyleneoxy).

$-(L^R-O-)_n-L^R-$   OA1

$L^R$ is an alkylene group (preferably having 1 to 12 carbon atoms, more preferably having 1 to 6 carbon atoms, and particularly preferably having 2 carbon atoms). n is preferably 1 to 200, more preferably 1 to 100, and particularly preferably 1 to 50.

d and e each independently represent 0 or 1. In view of productivity, d preferably 1, and e preferably 0.

With respect to V-1 and V-2, it is particularly preferable that d or e is 1, and U is an ethylene group.

W represents an acyl group or an alkoxycarbonyl group. As an acyl group in W, an acyl group having 1 to 30 carbon atoms is preferable, an acyl group having 1 to 12 carbon atoms is more preferable, an acyl group having 1 to 6 carbon atoms is even more preferably, and an acyl group having 2 to 3 carbon atoms is particularly preferable. For example, formyl, acetyl, n-propanol, and benzoyl are preferable, and acetyl is particularly preferable. As an alkoxycarbonyl group in W, an alkoxycarbonyl group having 2 to 30 carbon atoms is preferable, an alkoxycarbonyl group having 2 to 12 carbon atoms is more preferable, an alkoxycarbonyl group having 2 to 6 carbon atoms is even more preferable, and an alkoxycarbonyl group having 2 to 3 carbon atoms is particularly preferable. W is particularly preferably an acyl group, and an acetyl group is preferable, in view of easiness of manufacturing-obtainability of a raw material.

In a preferable embodiment according to the invention, the substituent X is preferably bonded to a nitrogen atom of a polymer base portion. Accordingly, adsorption properties increase. The reason thereof is not clear, but the followings are considered. That is, the nitrogen atom of the base portion is generally an amino group exists in a structure of an ammonium group or an amide group, and these are adsorbed by interaction between an acidic part on the surface of the inorganic solid electrolyte and a hydrogen bond-ion bond, or the like. Since the substituent X functions as an acid group, the substituent X can be an interaction between a basic part (a nitrogen atom or the like) of an active substance or a metal atom. That is, it is considered that, since this resin can adsorb the inorganic solid electrolyte or both of the basic part and the acidic part of the active substance with the nitrogen atom and the substituent X (the side chain X), adsorption properties increase, and thus adhesiveness rapidly increases.

The content of the substituent X is not particularly limited, but the content is preferably 0.01 to 5 mmol and most preferably 0.05 to 1 mmol with respect to 1 g of the nitrogen-containing polymer. In view of an acid value, the substituent X is preferably included in an amount in which an acid value becomes about 5 to 50 mgKOH/g, in view of adhesiveness when being used in an all-solid-state secondary battery. The acid value titration can be performed in the related art, and for example, an indicator method (a method of identifying a neutralization point by an indicator), an potential difference measuring method, or the like can be used. As a titration liquid used in acid value titration, a commercially available sodium hydroxide aqueous solution can be used. However, in the case where it is difficult to measure an acid value, a nonaqueous titration liquid such as a sodium methoxide-dioxane solution can be prepared, so as to measure an acid value.

(Substituent Y [Side Chain Y])

The substituent Y is a polymer chain including a hetero atom (any one of an oxygen atom, a sulfur atom, and a nitrogen atom is preferable) and is preferably a polyester chain, a polyamide chain, a polyimide chain, a polyacryl (poly(meth)acrylic acid ester) chain, a polyether chain, a polycarbonate chain. The substituent Y may be bonded to another nitrogen-containing polymer molecule, at the other end on the opposite side of one end.

The substituent Y may be bonded to a nitrogen atom of a polymer base portion. At this point, a portion thereof may be not only a covalent bond but also an ion bond. The ratio of Y and the nitrogen atom in a bonding mode is covalent bond:ion bond=100:0 to 0:100, but preferably in the range of 95:5 to 5:95, more preferably in the range of 90:10 to 10:90, and particularly preferably in the range of 95:5 to 80:20. If the ratio is in this range, the adhesiveness and the ion conductivity become better, and solution solubility increases. Specifically, the substituent Y is preferably amide-bonded to a nitrogen atom, and a portion thereof may be ionically bonded to a carboxylic acid salt.

The number average molecular weight of the substituent Y can be measured by a value in terms of polystyrene by a GPC method. The number average molecular weight of Y is preferably 500 or greater, more preferably 700 or greater, and particularly preferably 1,000 or greater. The upper limit thereof is preferably 1,000,000 or less, more preferably 100,000 or less, and particularly preferably 10,000 or less. The number average molecular weight is preferably caused to be a molecular weight in this range, in view of ion conductivity, adhesiveness, and temporal stability.

Two or more of the substituent Y (the side chain Y) are preferably linked to a main chain and five or more thereof are most preferably linked to a main chain, in one molecule of the resin. For example, the introducing method of the substituent Y can be obtained by condensing polymers forming a polyester chain, a polyamide chain, a polyimide chain, a polyacryl(poly(meth)acrylic aid ester) chain, a polyether chain, and a polycarbonate chain having carboxylic acid at a terminal with a prepolymer forming a main chain of a nitrogen-containing polymer.

The polyether chain preferably has a structure having a repeating unit of Formula PE1 below.

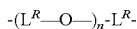   PE1

$L^S$ is an alkylene group (preferably having 1 to 12 carbon atoms, more preferably having 1 to 6 carbon atoms, and particularly preferably having 2 carbon atoms), an alkenylene group (preferably having 1 to 12 carbon atoms, more preferably having 1 to 6 carbon atoms, and particularly preferably having 2 carbon atoms). ns is preferably 2 to 200, more preferably 5 to 100, and particularly preferably 10 to 50.

The polyester chain preferably has a structure having a repeating unit of Formula PE2 below.

—(CO-$L^S$—O—)$_{ns}$-                 PE2

$L^S$ and ns have the same meanings as above.

The polyamide chain preferably has a structure having a repeating unit of Formula PE3 below.

—(CO-$L^S$-$NR^N$-)$_{ns}$-                 PE3

$L^S$ and ns have the same meanings as above.

The polyimide chain preferably has a structure having a repeating unit of Formula PE4 below.

—($NR^N$CO-$L^S$—CO—)$_{ns}$-                 PE4

$L^S$ and ns have the same meanings as above.

The polycarbonate chain preferably has a structure having a repeating unit of Formula PE5 below.

—(O—CO-$L^S$—O—)$_{ns}$-                 PE5

$L^S$ and ns have the same meanings as above.

The polyacryl chain preferably has a structure having a repeating unit of Formula PE6 below.

-($L^S$—C(Ac))$_{ns}$-                 PE6

$L^S$ and ns have the same meanings as above. Ac is an acyl group or an alkoxycarbonyl group (preferably having 2 to 12 carbon atoms and more preferably having 2 to 6 carbon atoms).

The types of the polymer forming the side chain Y or methods of introducing the polymer to a prepolymer to be a main chain can be refer to JP2009-203462A.

(Substituent Z [Side chain Z])

Z represents a group having a hydrogen atom forming —NH— by being bonded to a nitrogen atom and an alkyl group (preferably having 1 to 24 carbon atoms and more preferably having 1 to 18 carbon atoms) having 1 to 30 carbon atoms, a group (preferably having 1 to 24 carbon atoms and more preferably having 1 to 18 carbon atoms) having a halogenated alkyl group having 1 to 30 carbon atoms, and a group having a silicone chain (preferably having 1 to 80 silicon atoms and more preferably having 1 to 60 silicon atoms) having 1 to 100 silicon atoms.

A number average molecular weight of the substituent Z (side chain Z) is preferably 500 or greater, more preferably 700 or greater, and particularly preferably 1,000 or greater. The upper limit thereof is preferably 1,000,000 or less, more preferably 100,000 or less, and particularly preferably 10,000 or less. If the molecular weight is caused to be in the range described above, the solubility and the preservation stability of the polymer is preferably caused to be compatible to each other.

Z preferably has a structure represented by #-$L^R$-($L^1$)$_p$-$Z^1$.

# represents a site at which a nitrogen atom included in a base portion of the nitrogen-containing polymer is bonded.

$L^R$ represents an alkylene group (preferably having 1 to 8 carbon atoms and more preferably having 1 to 4 carbon atoms) having 1 to 12 carbon atoms.

$L^1$ represents CO, $NR^N$, O, or a combination thereof. Among these, CO and COO are preferable. p represents 0 or 1.

R represents a hydrogen atom or a substituent. As a substituent, an alkyl group (preferably having 1 to 24 carbon atoms, more preferably having 1 to 12 carbon atoms, even more preferably having 1 to 6 carbon atoms, and particularly preferably having 1 to 3 carbon atoms), an alkenyl group (preferably having 2 to 24 carbon atoms, more preferably having 2 to 12 carbon atoms, even more preferably having 2 to 6 carbon atoms, and particularly preferably having 2 to 3 carbon atoms), an alkynyl group (preferably having 2 to 24 carbon atoms, more preferably having 2 to 12 carbon atoms, even more preferably having 2 to 6 carbon atoms, and particularly preferably having 2 to 3 carbon atoms), an aralkyl group (preferably having 7 to 22 carbon atoms, more preferably having 7 to 14 carbon atoms, and particularly preferably having 7 to 10 carbon atoms), and an aryl group (preferably having 6 to 22 carbon atoms, more preferably having 6 to 14 carbon atoms, and particularly preferably having 6 to 10 carbon atoms) are preferable.

$Z^1$ represents a group having an alkyl group (preferably having 1 to 24 carbon atoms and more preferably having 1 to 18 carbon atoms) having 1 to 30 carbon atoms, a group (preferably having 1 to 24 carbon atoms and more preferably having 1 to 18 carbon atoms) having a halogenated alkyl group having 1 to 30 carbon atoms, and a group having a silicone chain (preferably having 1 to 80 silicon atoms and more preferably having 1 to 60 carbon atoms) having 1 to 100 silicon atoms.

A degree of halogen substitution (a value obtained by dividing the number of halogen by a substitutable number) of a halogenated alkyl group is preferably 0.6 or greater, more preferably 0.8 or greater, and even more preferably 0.9 or greater. 1 is particularly preferable. Among the halogen atom, a fluorine atom is preferable. Among these, a perfluoroalkyl group is preferable.

The silicone chain preferably has a structure represented by Formula S1.

—(Si($R^{S1}$)$_2$—O)$_m$—$R^{S2}$                 S1

In the formula, $R^{S1}$ represents a hydrogen atom, an alkyl group (preferably having 1 to 12 carbon atoms, more preferably having 1 to 6 carbon atoms, and particularly preferably having 1 to 3 carbon atoms), an aryl group (preferably having 6 to 22 carbon atoms, more preferably having 6 to 14 carbon atoms, and particularly preferably having 6 to 10 carbon atoms), an aralkyl group (preferably having 7 to 23 carbon atoms, more preferably having 7 to 15 carbon atoms, and particularly preferably having 7 to 11 carbon atoms), or a hydroxyl group.

$R^{S2}$ represents a hydrogen atom, a silyl group (preferably having 1 to 12 carbon atoms, more preferably having 1 to 6 carbon atoms, and particularly preferably having 1 to 3 carbon atoms), an alkyl group (preferably having 1 to 12 carbon atoms, more preferably having 1 to 6 carbon atoms, and particularly preferably having 1 to 3 carbon atoms), an aryl group (preferably having 6 to 22 carbon atoms, more preferably having 6 to 14 carbon atoms, and particularly preferably having 6 to 10 carbon atoms), or an aralkyl group (preferably having 7 to 23 carbon atoms, more preferably having 7 to 15 carbon atoms, and particularly preferably having 7 to 11 carbon atoms).

m is a natural number, preferably 1 to 100 and more preferably 3 to 20.

The nitrogen-containing polymer preferably has a repeating unit represented by any one of Formulae (1-1) to (1-3) and (2-1) to (2-3) described below.

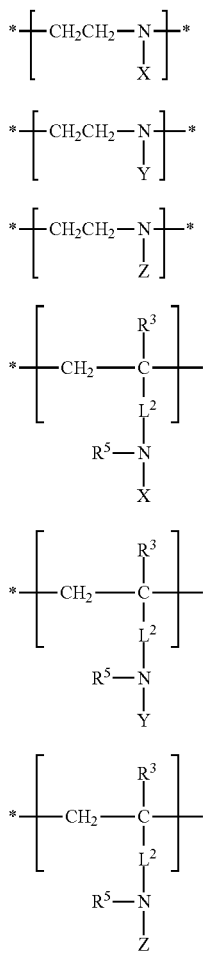

(1-1)
(1-2)
(1-3)
(2-1)
(2-2)
(2-3)

$R^3$ represents a hydrogen atom, a halogen atom, or an alkyl group (preferably having 1 to 12 carbon atoms, more preferably having 1 to 6 carbon atoms and even more preferably having 1 to 3 carbon atoms, and a methyl group is particularly preferable).

$R^5$ represents a hydrogen atom or an alkyl group (preferably having 1 to 12 carbon atoms, more preferably having 1 to 6 carbon atoms, and particularly preferably having 1 to 3 carbon atoms).

$L^2$ represents a single bond, an alkylene group (preferably, a methylene group, an ethylene group, and a propylene group), CO, O, or a combination thereof. Among these, a methylene group, an ethylene group, and $COOL^3$ are preferable. $L^3$ is a methylene group, an ethylene group, and a propylene group.

X, Y, and Z have the same meaning as above.

\* represents a linking portion between repeating units.

A repeating unit represented by Formula (1-2) above is preferably represented by Formula (1-2I) or (1-2II) below.

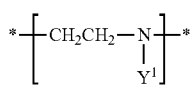

(1-2I)

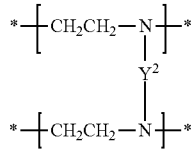

(1-2II)

In the formula, \* represents a linking portion between repeating units.

$Y^1$ represents a univalent polyester chain, a univalent polyamide chain, a univalent polyimide chain, a univalent polyacryl chain, a univalent polyether chain, or a univalent polycarbonate chain of which a number average molecular weight is 500 to 1,000,000. The preferable molecular weight thereof is the same as that of Y above.

$Y^2$ represents a divalent polyester chain, a divalent polyamide chain, a divalent polyimide chain, a divalent polyacryl chain, a divalent polyether chain, or a divalent polycarbonate chain, of which a number average molecular weight is 500 to 1,000,000. The preferable molecular weight thereof is the same as that of Y above.

The repeating unit represented by Formula (2-2) above is preferably represented by Formula (2-2I) or (2-2II) below.

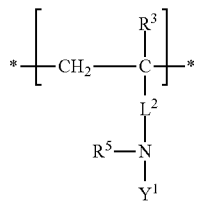

(2-2I)

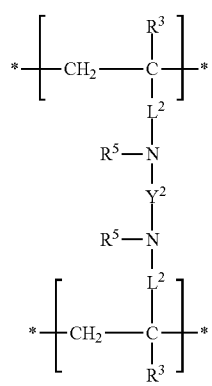

(2-2II)

In the formula, $R^3$, $R^5$, and $L^2$ represent groups as above.

$Y^1$ represents a univalent polyester chain, a univalent polyamide chain, a univalent polyimide chain, a univalent polyacryl chain, a univalent polyether chain, or a univalent polycarbonate chain, of which a number average molecular weight is 500 to 1,000,000. The preferable molecular weight thereof is the same as that of Y above.

$Y^2$ represents a divalent polyester chain, a divalent polyamide chain, a divalent polyimide chain, a divalent polyacryl chain, a divalent polyether chain, or a divalent polycarbonate chain, of which a number average molecular weight is 500 to 1,000,000. The preferable molecular weight thereof is the same as that of Y above.

$Y^1$ above is preferably $L^4COY^{11}$ or $L^4COOY^{11}$ and more preferably represented by a formula below. $L^4$ is a single bond or an alkylene group (preferably having 1 to 12 carbon atoms, more preferably having 1 to 6 carbon atoms, and particularly preferably having 1 to 3 carbon atoms).

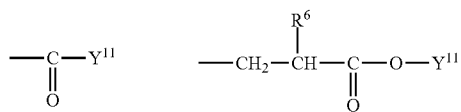

$Y^{11}$ represents any one of a univalent polyether chain, a univalent polyester chain, a univalent polycarbonate chain, and a univalent polyacryl chain. $R^6$ represents a hydrogen atom or a methyl group. A preferable range of $Y^{11}$ is the same as that of Y.

$Y^2$ above is preferably $L^4COY^{11}COL^4$ or $L^4COOY^{11}OCOL^4$ and more preferably represented by a formula below.

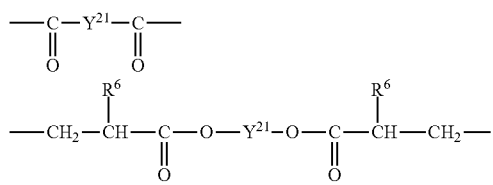

$Y^{21}$ represents any one of a divalent polyether chain, a divalent polyester chain, a divalent polycarbonate chain, and a divalent polyacryl chain. $R^6$ represents a hydrogen atom or a methyl group. A preferable range of $Y^{21}$ has the same meaning as that of Y.

The nitrogen-containing polymer is preferably a copolymer and preferably includes a repeating unit in the following combinations.

A repeating unit of Formula (1-1) and a repeating unit of Formula (1-2)
A repeating unit of Formula (1-1) and a repeating unit of Formula (1-3)
A repeating unit of Formula (1-2) and a repeating unit of Formula (1-3)
A repeating unit of Formula (2-1) and a repeating unit of Formula (2-2)
A repeating unit of Formula (2-1) and a repeating unit of Formula (2-3)
A repeating unit of Formula (2-2) and a repeating unit of Formula (2-3)

A preferable range of a copolymerization ratio is represented as follows.

A Z portion, a X portion, a Y1 portion, and a Y2 portion totally satisfy 100.

TABLE 1

| | Preferably | More preferably | mol ratio % Particularly preferably |
|---|---|---|---|
| Formulae 1-1 and 2-1 (X portion) | 0 to 30 | 1 to 20 | 2 to 10 |
| Formulae 1-2I and 2-2I (Y1 portion) | 0 to 60 | 5 to 50 | 10 to 40 |
| Formulae 1-2II and 2-2II (Y2 portion) | 0 to 10 | 0 to 5 | 0 to 2 |
| Formulae 1-3 and 2-3 (Z portion) | 10 to 90 | 10 to 80 | 10 to 70 |

As a base material, examples of the nitrogen-containing polymer include polyethyleneimine, polyallylamine, and an aminoethylated acryl polymer (an aziridine ring-opened polymer).

Commercially available products of polyethyleneimine include SP-003 (polyethyleneimine (manufactured by Nippon Shokubai Co., Ltd.) number average molecular weight: 300), SP-006 (polyethyleneimine (manufactured by Nippon Shokubai Co., Ltd.) number average molecular weight: 600), SP-012 (polyethyleneimine (manufactured by Nippon Shokubai Co., Ltd.) number average molecular weight: 1,200), SP-018 (polyethyleneimine (manufactured by Nippon Shokubai Co., Ltd.) number average molecular weight: 1,800), and SP-020 (polyethyleneimine (manufactured by Nippon Shokubai Co., Ltd.) number average molecular weight: 10,000). Commercially available products of polyallylamine include PAA-01 (polyallylamine (manufactured by Nitto Boseki Co., Ltd.) weight-average molecular weight: 1,000), PAA-03 (polyallylamine (manufactured by Nitto Boseki Co., Ltd.) weight-average molecular weight: 3,000), PAA-05 (polyallylamine (manufactured by Nitto Boseki Co., Ltd.) weight-average molecular weight: 5,000), PAA-08 (polyallylamine (manufactured by Nitto Boseki Co., Ltd.) weight-average molecular weight: 8,000), and PAA-15 (polyallylamine (manufactured by Nitto Boseki Co., Ltd.) weight-average molecular weight: 15,000). Examples of the aminoethylated acryl polymer include POLYMENT NK-100PM (an aminoethylated acryl polymer (manufactured by Nippon Shokubai Co., Ltd.)), POLYMENT NK-200PM (an aminoethylated acryl polymer (manufactured by Nippon Shokubai Co., Ltd.)), POLYMENT NK-350 (an aminoethylated acryl polymer (manufactured by Nippon Shokubai Co., Ltd.)), and POLYMENT NK-380 (an aminoethylated acryl polymer (manufactured by Nippon Shokubai Co., Ltd.)).

Specific embodiments of the nitrogen-containing polymer are described below with specific structures of repeating units having resins and combinations thereof, but the invention is not limited thereto. In formulae below, k, 1, m, and n respectively represent polymerization molar ratios of the repeating units, k represents 0 to 80, 1 represents 0 to 90, m represents 0 to 80, n represents 0 to 70, and k+1+m+n=100 is satisfied. p and q represent the number of linkages of the polyester chain, and p and q each independently represent 5 to 100,000. s represents a repeating unit and represents 1 to 100. R' represents a hydrogen atom or an alkoxycarbonyl group. Among the formulae below, a formula in which a repeating unit is not described can obtain an arbitrary polymerization molar ratio.

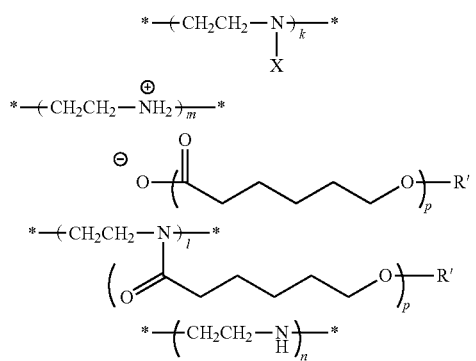

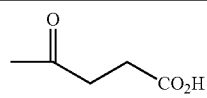

(A-1)

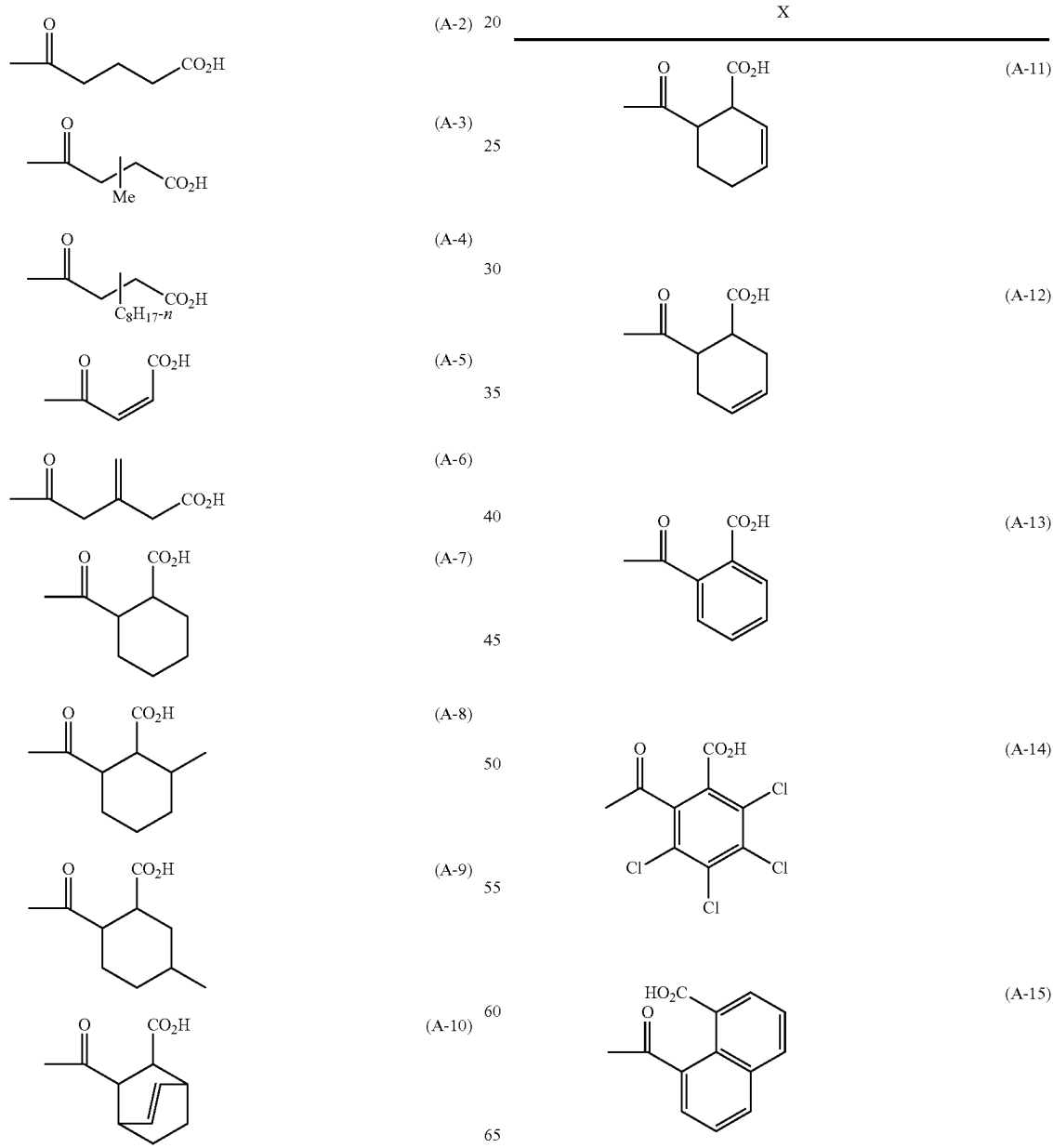

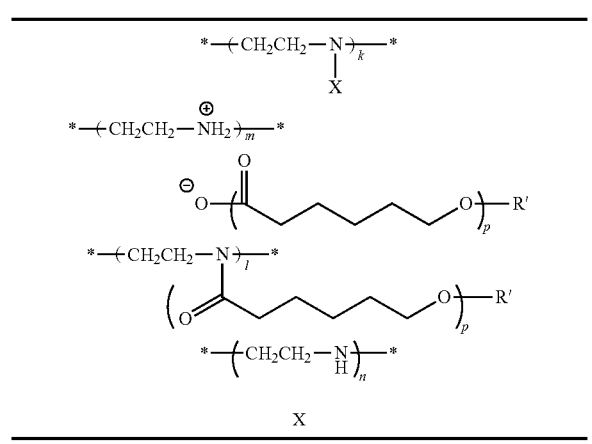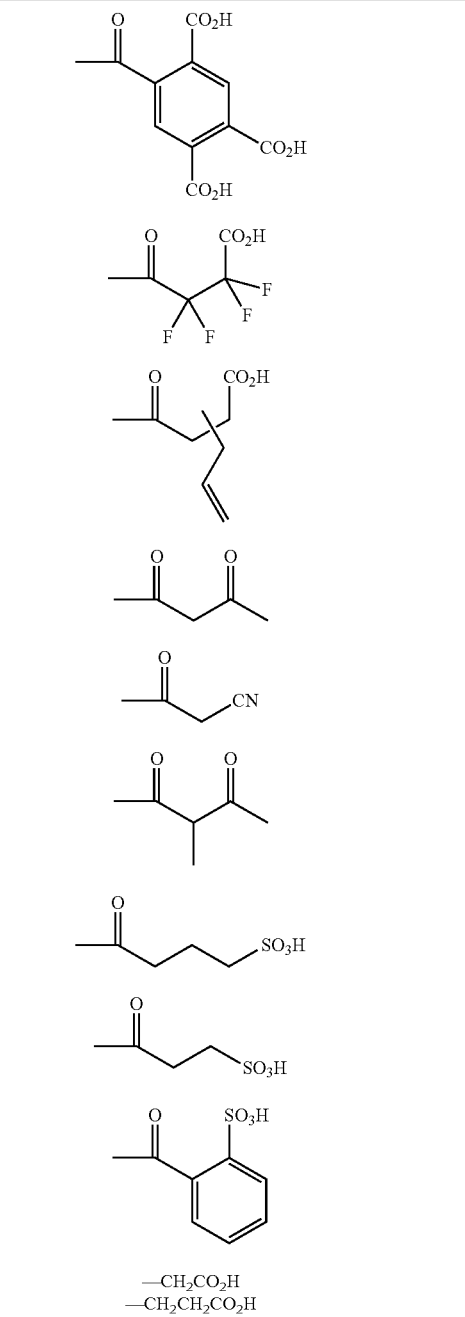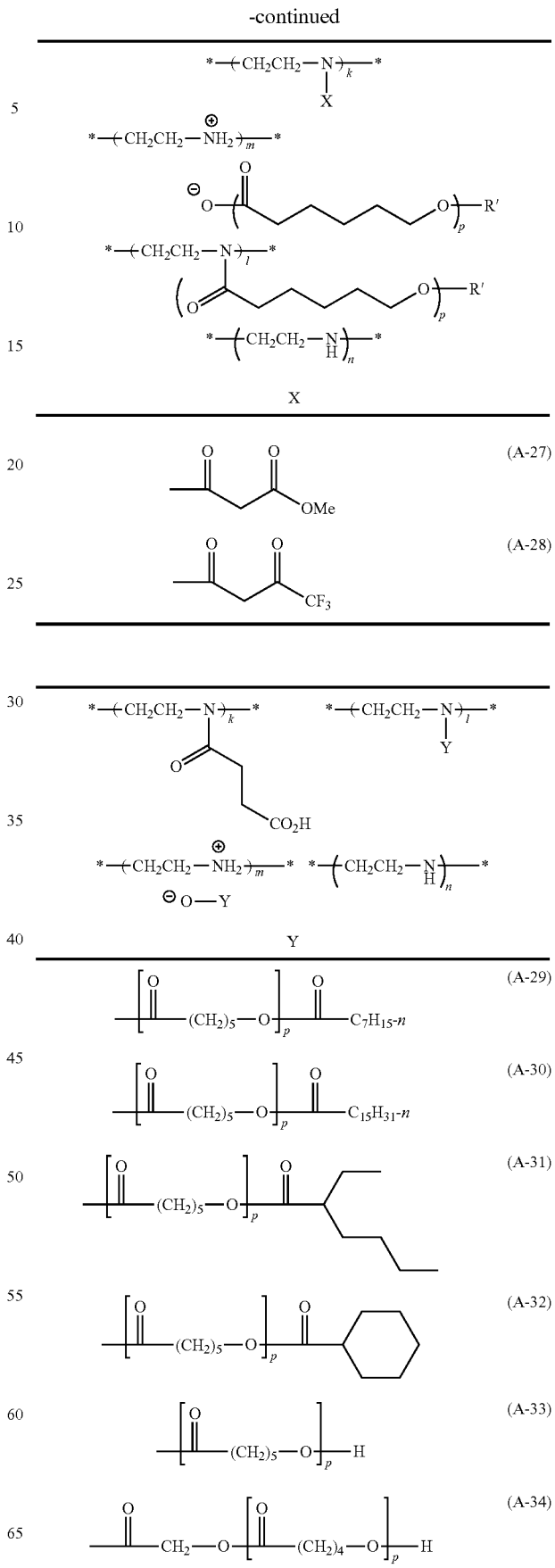

-continued
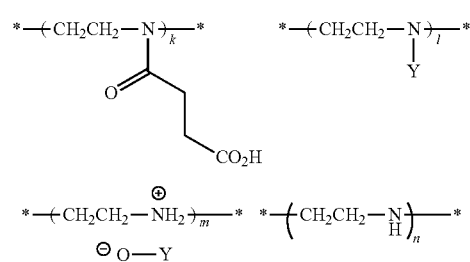
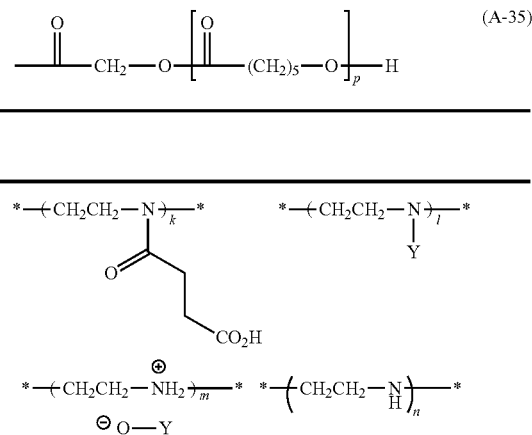
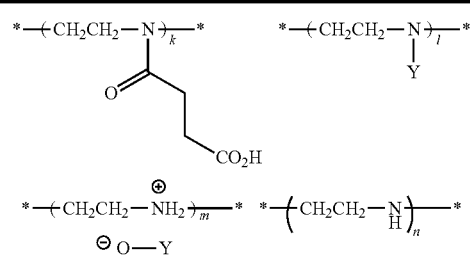
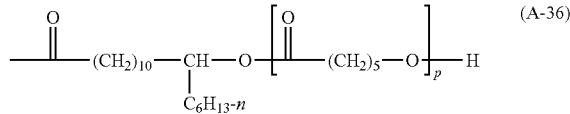
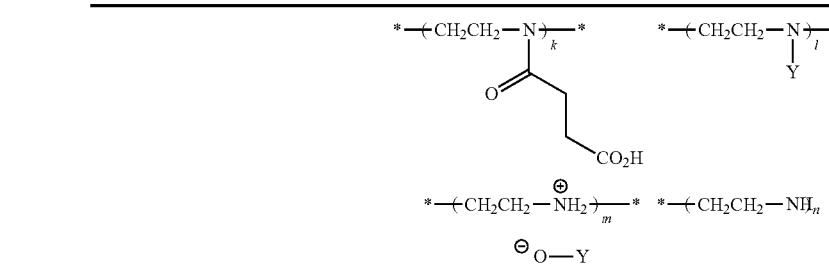
-continued
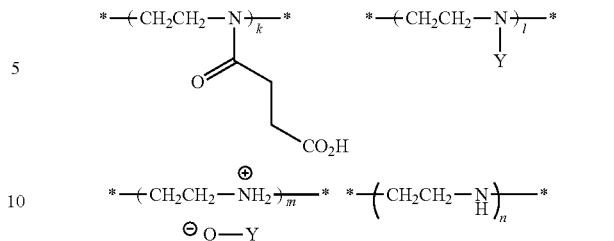
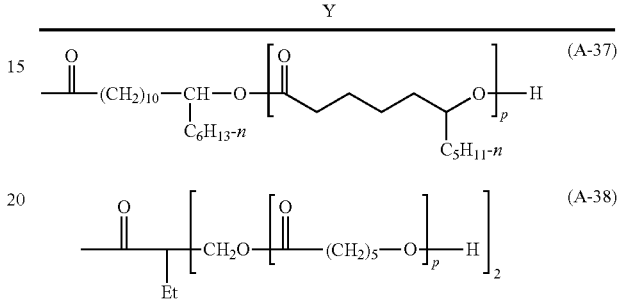
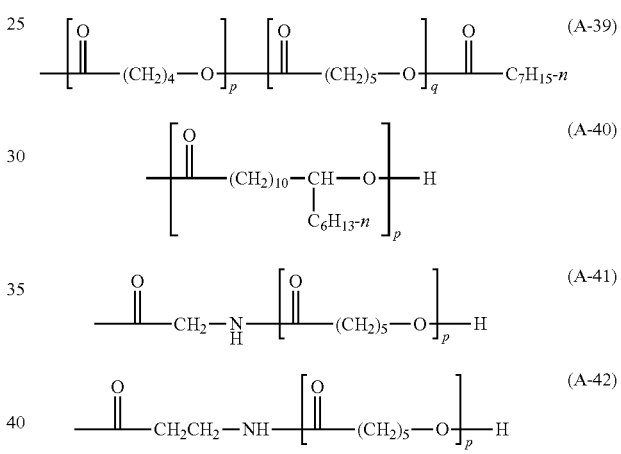
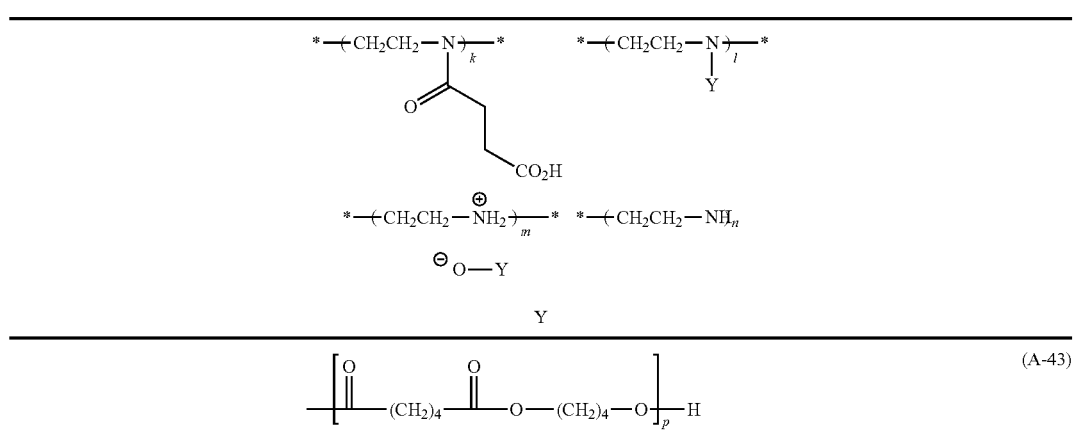
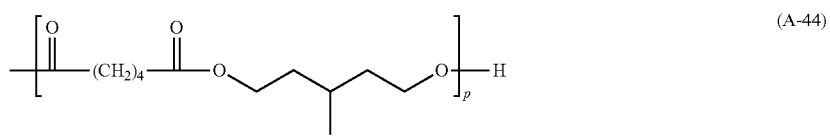

-continued
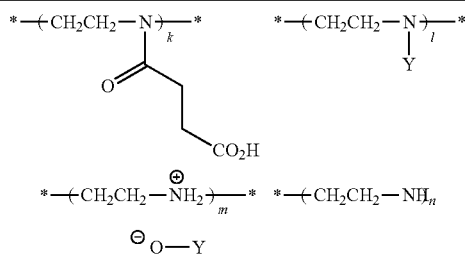
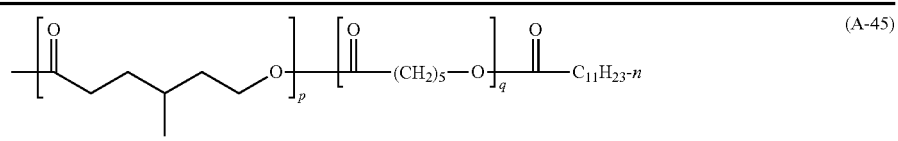
Y
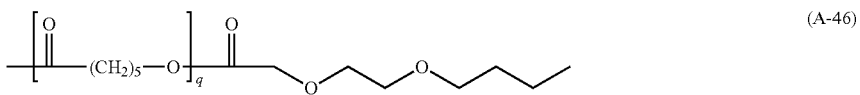 (A-45)
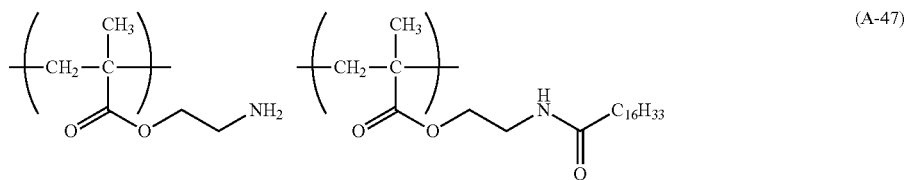 (A-46)
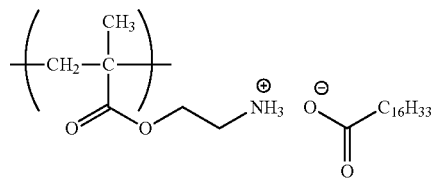 (A-47)
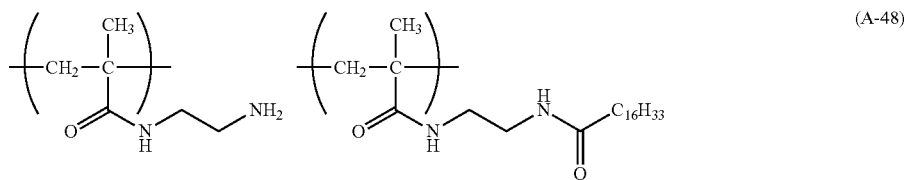
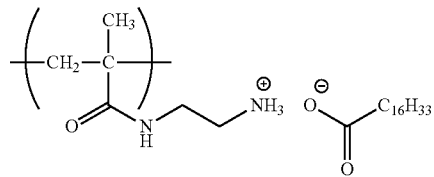 (A-48)
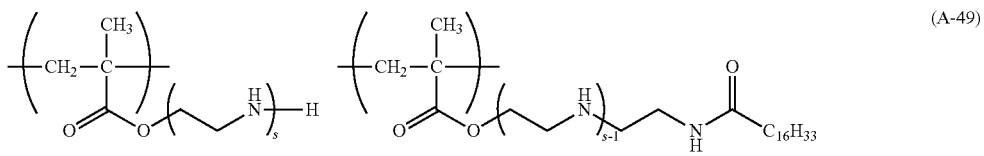 (A-49)
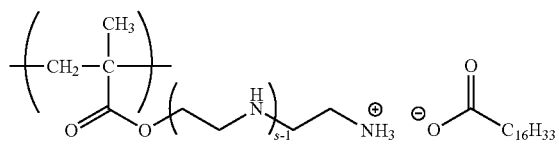

-continued
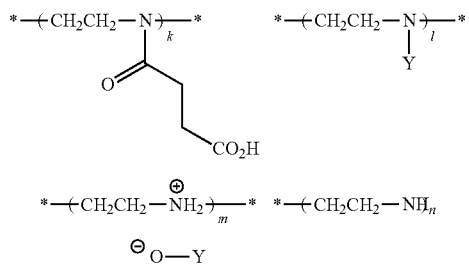
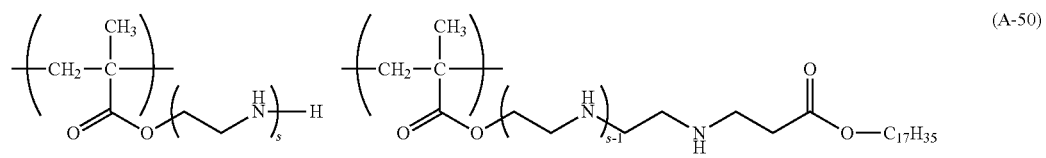
Y
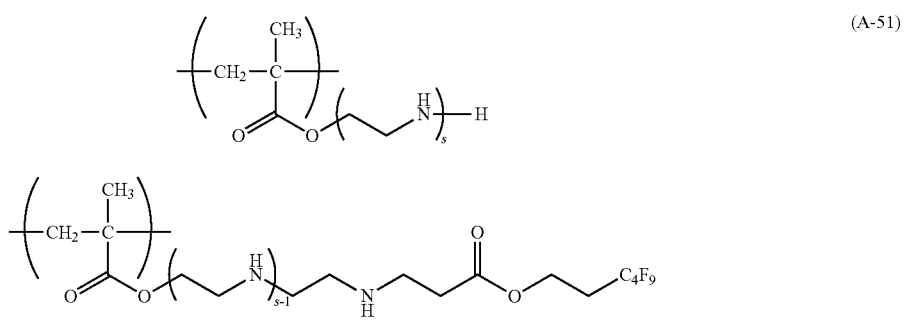
(A-50)
(A-51)
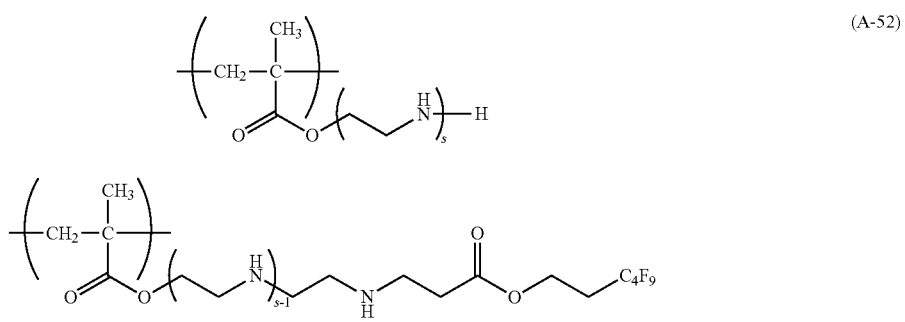
(A-52)
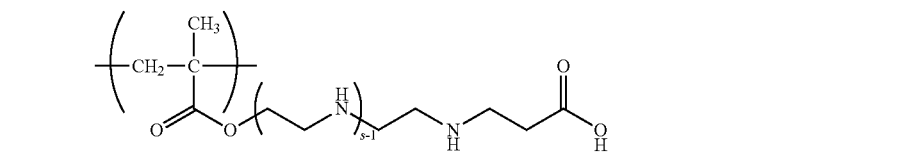
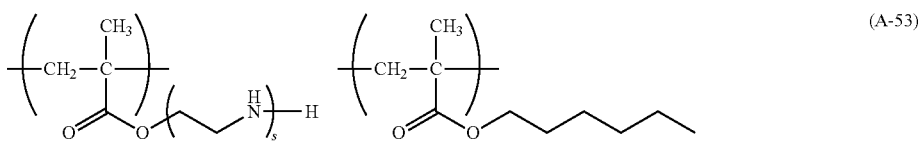
(A-53)

-continued
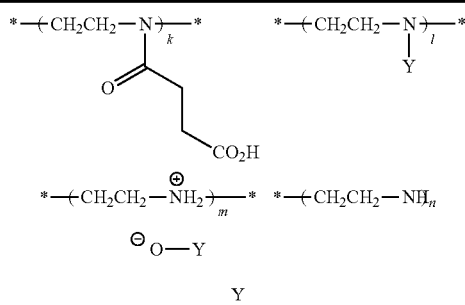
| Y |
|---|
| 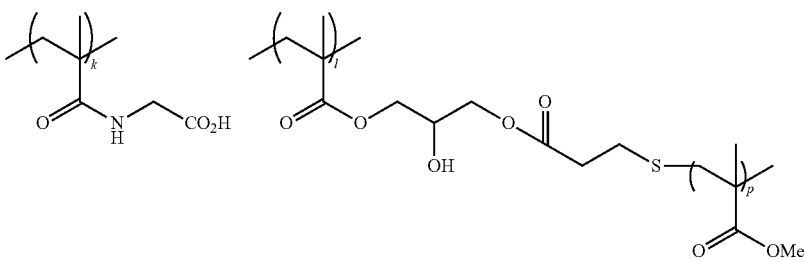 (A-54) |
| 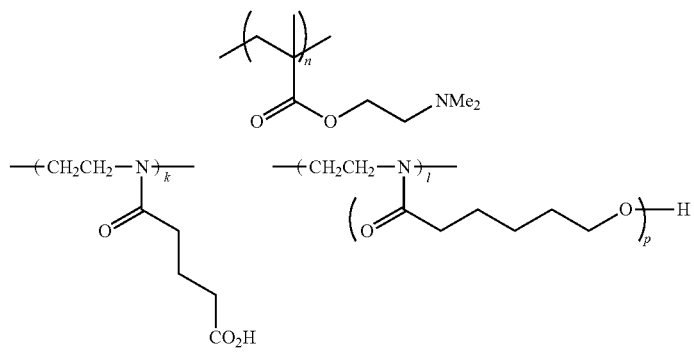 (A-55) |
| 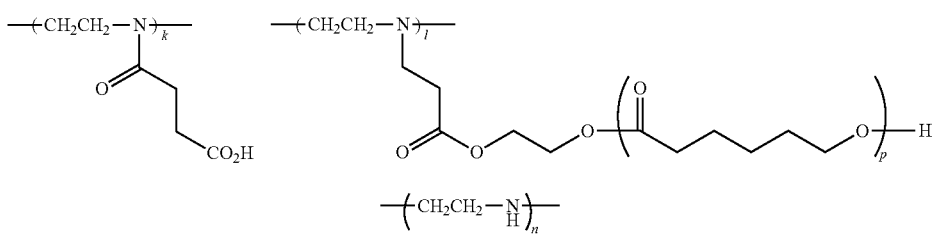 (A-56) |
| 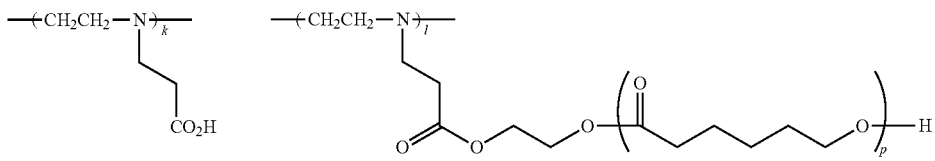 (A-57) |
| 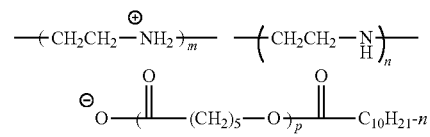<br>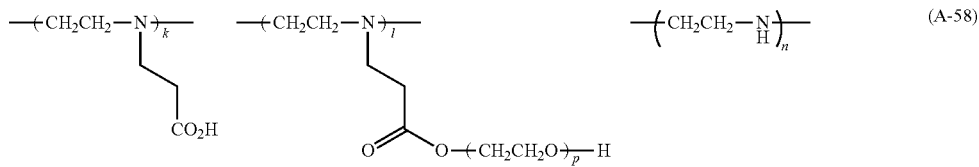 (A-58) |

-continued
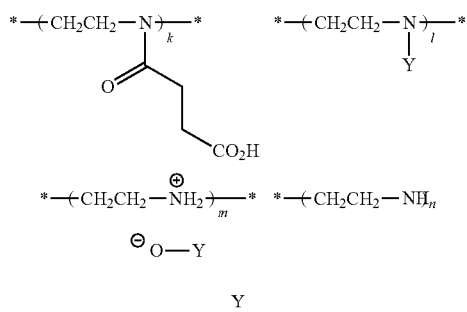
| Y |
|---|
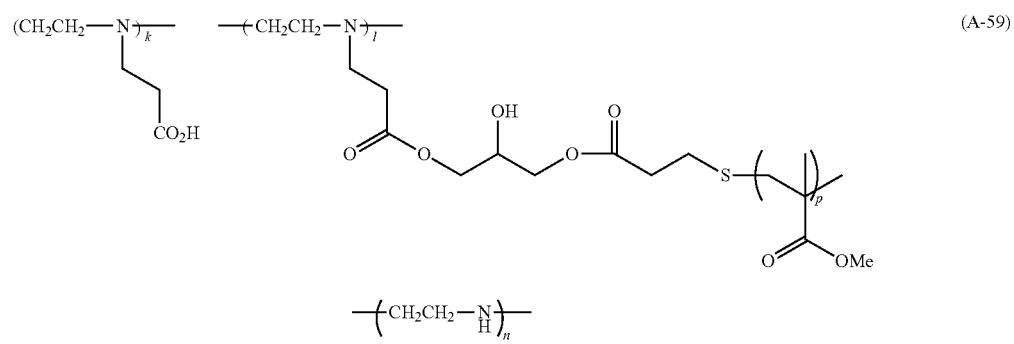 (A-59)
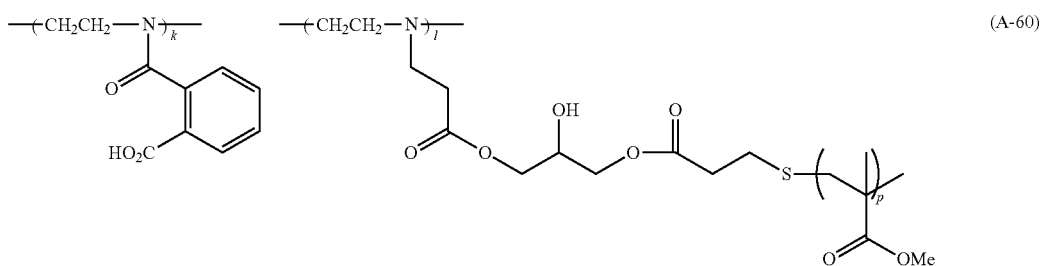 (A-60)
 (A-61)
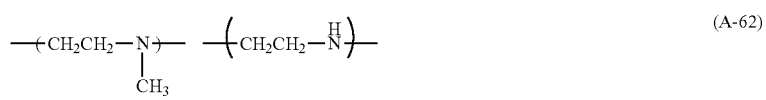 (A-62)
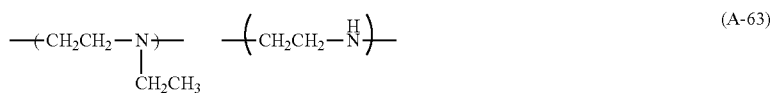 (A-63)
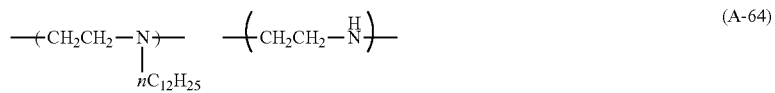 (A-64)
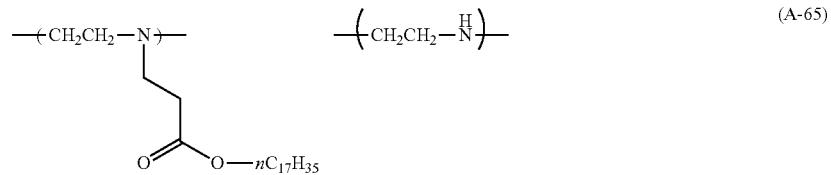 (A-65)

-continued
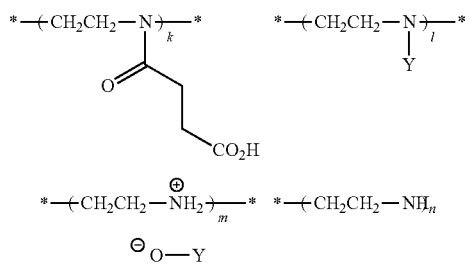
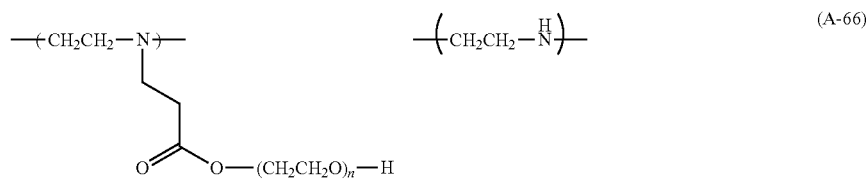
(A-66)
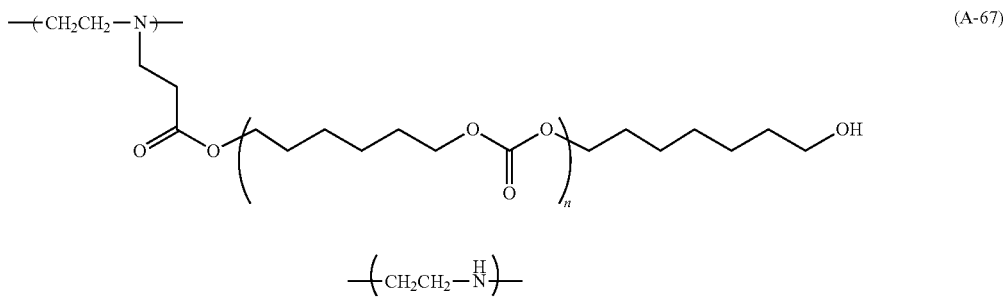
(A-67)
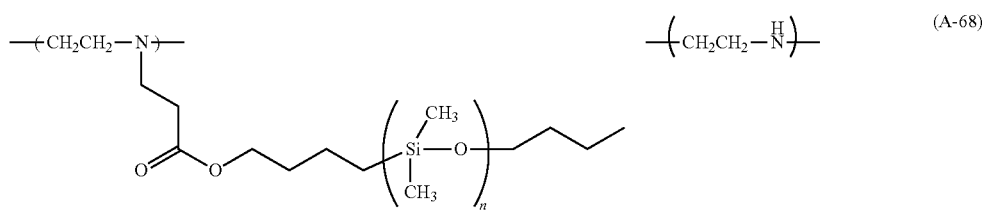
(A-68)
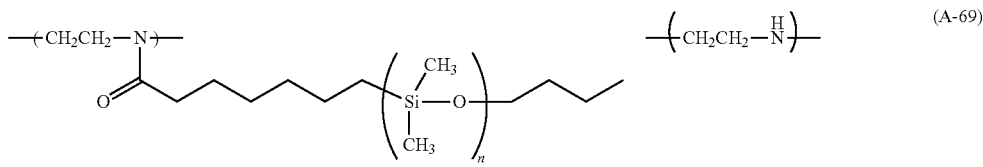
(A-69)
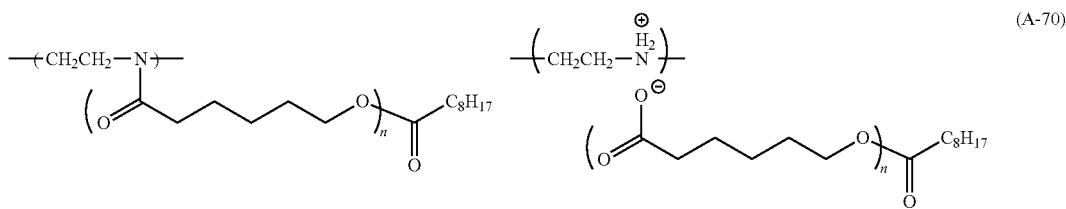
(A-70)
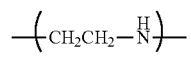

-continued
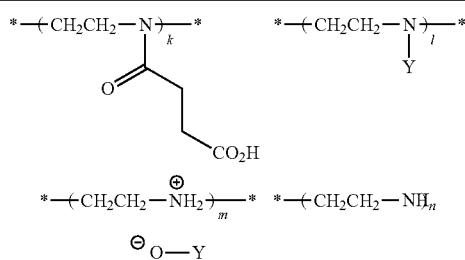
Y
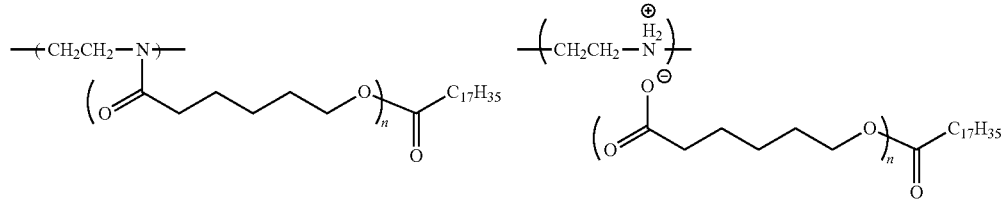 (A-71)
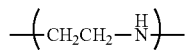
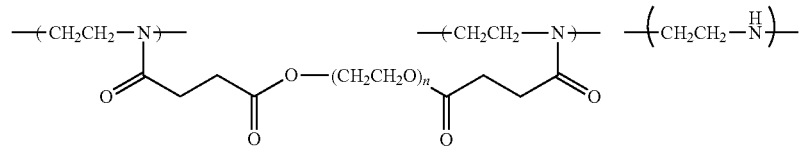 (A-72)
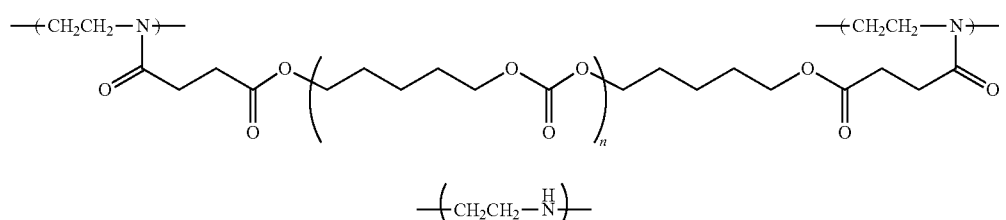 (A-73)
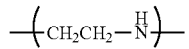
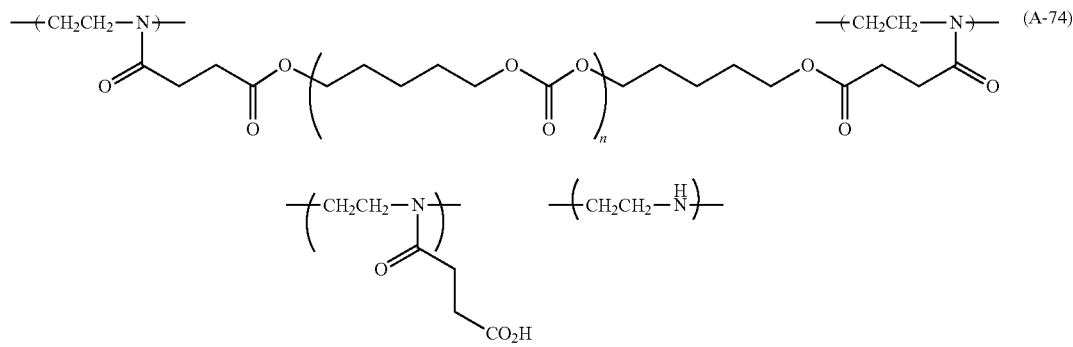 (A-74)
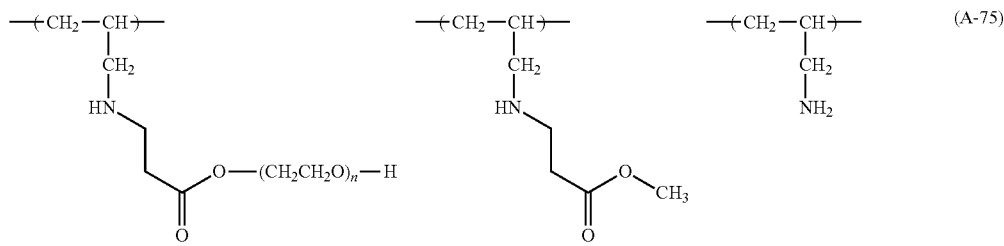 (A-75)

-continued
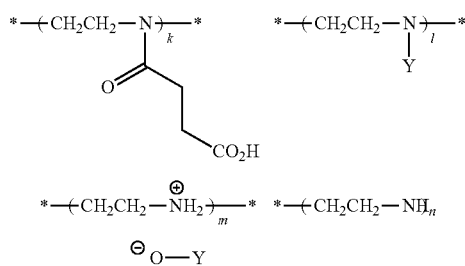
Y
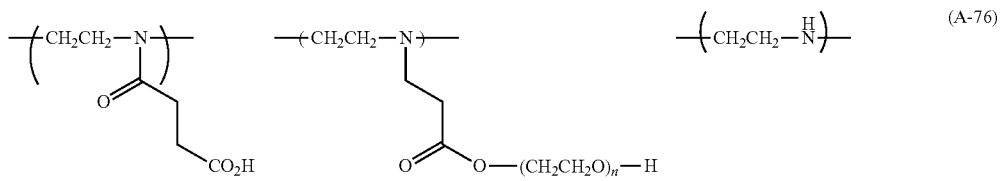 (A-76)
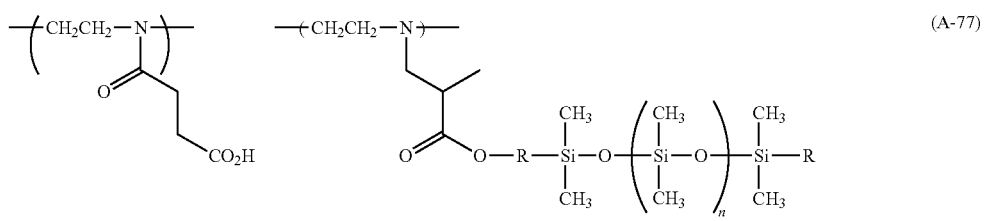 (A-77)
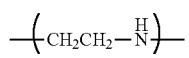
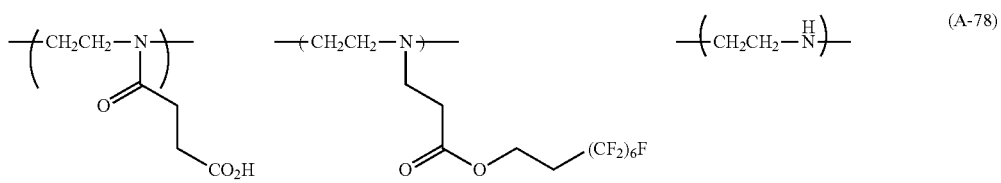 (A-78)
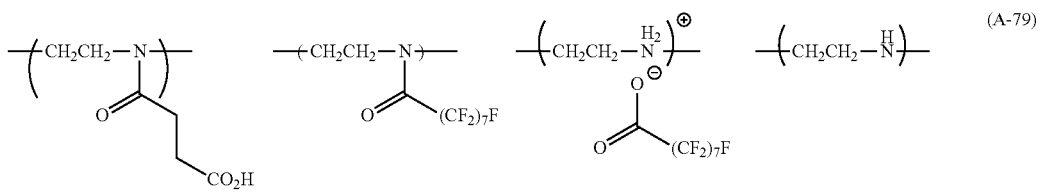 (A-79)
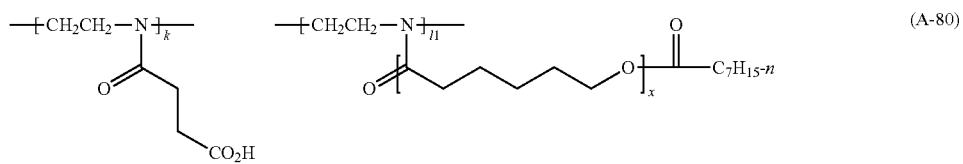 (A-80)
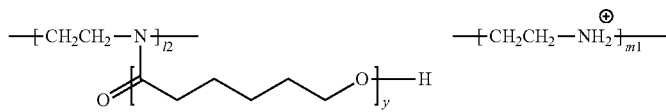

-continued

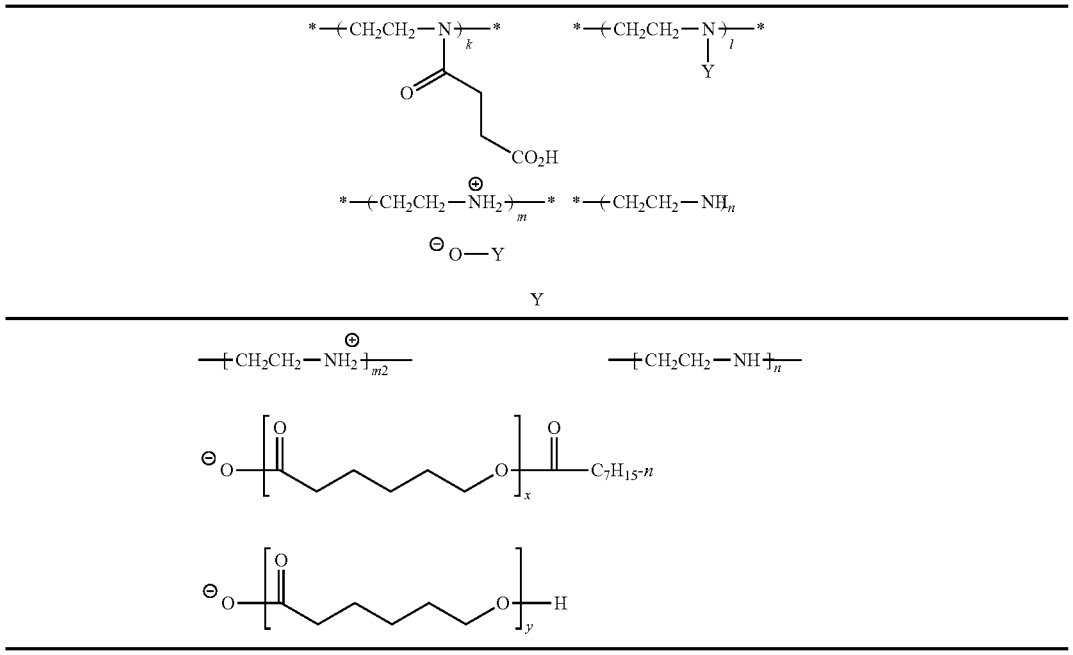

A linking group R of A-77 is a propylene group. A substituent R is a propyl group.

A-80 is described with reference to embodiments below.

The number average molecular weight of the nitrogen-containing polymer is preferably 1,000 or greater, more preferably 5,000 or greater, and particularly preferably 10,000 or greater. The upper limit thereof is preferably 500,000 or less, more preferably 100,000 or less, and particularly preferably 50,000 or less.

The formulation amount of the nitrogen-containing polymer is preferably 0.1 parts by mass or greater, more preferably 0.3 parts by mass or greater, and particularly preferably 1 parts by mass or greater with respect to 100 parts by mass of the inorganic solid electrolyte (including an active substance in the case where an active substance is used). The upper limit thereof is preferably 20 parts by mass or less and more preferably 10 parts by mass or less.

With respect to the solid electrolyte composition, in the solid content, the formulation amount of the nitrogen-containing polymer is preferably 0.1 mass % or greater, more preferably 0.3 mass % or greater, and particularly preferably 1 mass % or greater. The upper limit thereof is preferably 20 mass % or less and more preferably 10 mass % or less. If the nitrogen-containing polymer is caused to be in the range above, adherence of the inorganic solid electrolyte and the suppression properties of the interface resistance can be realized in a compatible manner.

The acid value of the nitrogen-containing polymer is preferably 0.05 mmol/g or greater, more preferably 0.1 mmol/g or greater, and particularly preferably 0.3 mmol/g or greater. The upper limit thereof is preferably 10 mmol/g or less, more preferably 5 mmol/g or less, and particularly preferably 2 mmol/g or less.

An amine value of the nitrogen-containing polymer is preferably 0.1 mmol/g or greater, more preferably 0.5 mmol/g or greater, and particularly preferably 0.8 mmol/g or greater. The upper limit thereof is preferably 20 mmol/g or less, more preferably 10 mmol/g or less, and particularly preferably 5 mmol/g or less.

If the acid value and the amine value of the nitrogen-containing polymer are caused to be in the range described above, suitable binding properties and suitable ion conductivity can be more effectively realized.

In this specification, unless described otherwise, the acid value and the amine value of the polymer are under the conditions measured in the examples below.

One type of the nitrogen-containing polymer may be used singly or two or more types thereof may be used in combination. The nitrogen-containing polymer may be used in combination with other particles.

The nitrogen-containing polymer according to the invention may be a particle shape. The average particle diameter of the particles is preferably 1,000 nm or less, more preferably 750 nm or less, even more preferably 500 nm or less, further more preferably 300 nm or less, and particularly preferably 200 nm or less. The lower limit thereof is preferably 10 nm or greater, more preferably 20 nm or greater, even more preferably 30 nm or greater, and particularly preferably 50 nm or greater.

When the inorganic solid electrolyte has a particle shape, it is preferable that the average particle diameter of the inorganic solid electrolyte is smaller than the particle diameter of the nitrogen-containing polymer is small.

If the size of the particles of the nitrogen-containing polymer is in the range described above, the suitable adhesiveness and the suppression of the suitable interface resistance can be realized.

The measuring of the created all-solid-state secondary battery is performed, for example, by measuring an electrode material in a method of measuring a particle diameter of a binder described below after the battery is decomposed and electrodes are removed, and eliminating a measured value of a particle diameter of particles other than the binder which are measured in advance.

With respect to the indication of the compound in the specification (for example, when a compound is attached at the foot of the indication), the indication is meant to include not only the compound but also a salt thereof and an ion thereof. The indication is meant to include a derivative in which a portion is changed such as a case where a substituent is introduced in the range in which a desired effect is achieved.

A substituent in which substitution or non-substitution is not indicated in this specification (in the same manner as in the linking group) means having an arbitrary substituent in the group. The meaning is the same as in the compound in which substitution or non-substitution is not indicated. Examples of the preferable substituent include the substituent T below.

Examples of the substituent T include the followings.

Examples thereof include an alkyl group (preferably an alkyl group having 1 to 20 carbon atoms, for example, methyl, ethyl, isopropyl, t-butyl, pentyl, heptyl, 1-ethylpentyl, benzyl, 2-ethoxyethyl, and 1-carboxymethyl), an alkenyl group (preferably an alkenyl group having 2 to 20 carbon atoms, for example, vinyl, allyl, and oleyl), an alkynyl group (preferably an alkynyl group having 2 to 20 carbon atoms, for example, ethynyl, butadiynyl, and phenylethynyl), a cycloalkyl group (preferably a cycloalkyl group having 3 to 20 carbon atoms, for example, cyclopropyl, cyclopentyl, cyclohexyl, and 4-methylcyclohexyl), an aryl group (preferably an aryl group having 6 to 26 carbon atoms, for example, phenyl, 1-naphthyl, 4-methoxyphenyl, 2-chlorophenyl, and 3-methylphenyl), a heterocyclic group (preferably a heterocyclic group having 2 to 20 carbon atoms, it is preferable that a heterocyclic group of 5 or 6-membered ring having at least one of an oxygen atom, a sulfur atom, or a nitrogen atom is preferable, for example, 2-pyridyl, 4-pyridyl, 2-imidazolyl, 2-benzimidazolyl, 2-thiazolyl, and 2-oxazolyl), an alkoxy group (preferably an alkoxy group having 1 to 20 carbon atoms, for example, methoxy, ethoxy, isopropyloxy, and benzyloxy), an aryloxy group (preferably an aryloxy group having 6 to 26 carbon atoms, for example, phenoxy, 1-naphthyloxy, 3-methylphenoxy, and 4-methoxyphenoxy), an alkoxycarbonyl group (preferably an alkoxycarbonyl group having 2 to 20 carbon atoms, for example, ethoxycarbonyl and 2-ethylhexyloxycarbonyl), an amino group (preferably an amino group having 0 to 20 carbon atoms, examples thereof include an alkylamino group and an arylamino group, for example, amino, N,N-dimethylamino, N,N-diethylamino, N-ethylamino, and anilino), a sulfamoyl group (preferably a sulfamoyl group having 0 to 20 carbon atoms, for example, N,N-dimethylsulfamoyl and N-phenylsulfamoyl), an acyl group (preferably an acyl group having 1 to 20 carbon atoms, for example, acetyl, propionyl, butyryl, and benzoyl), an acyloxy group (preferably an acyloxy group having 1 to 20 carbon atoms, for example, acetyloxy, benzoyloxy), a carbamoyl group (preferably a carbamoyl group having 1 to 20 carbon atoms, for example, N,N-dimethylcarbamoyl and N-phenylcarbamoyl), an acylamino group (preferably an acylamino group having 1 to 20 carbon atoms, for example, acetylamino, and benzoylamino), a sulfonamide group (preferably a sulfamoyl group having 0 to 20 carbon atoms, for example, methanesulfonamide, benzenesulfonamide, N-methylmethanesulfonamide, and N-ethylbenzenesulfonamide), an alkylthio group (preferably an alkylthio group having 1 to 20 carbon atoms, for example, methylthio, ethylthio, isopropylthio, and benzylthio), arylthio group (preferably an arylthio group having 6 to 26 carbon atoms, for example, phenylthio, 1-naphthylthio, 3-methylphenylthio, and 4-methoxyphenylthio), an alkyl or arylsulfonyl group (preferably an alkyl or arylsulfonyl group having 1 to 20 carbon atoms, for example, methylsulfonyl, ethylsulfonyl, and benzenesulfonyl), a hydroxyl group, a cyano group, a halogen atom (for example, a fluorine atom, a chlorine atom, a bromine atom, and an iodine atom). An alkyl group, an alkenyl group, an aryl group, a heterocyclic group, an alkoxy group, an aryloxy group, an alkoxycarbonyl group, an amino group, an acylamino group, a phosphonic acid group, a sulfonic acid group, a phosphoric acid group, a carboxyl group, a hydroxyl group, or a halogen atom are more preferable.

Respective groups exemplified in the substituent T may be further substituted with the substituent T.

When a compound, a substituent.linking group, or the like includes an alkyl group.alkylene group, an alkenyl group.alkenylene group, an alkynyl group.alkynylene group, or the like, these may be a cyclic shape or a chain shape, may be linear or branched, or may be substituted as described above or unsubstituted. At this point, a group (for example, O, S, CO, or $NR^N$) including a hetero atom is interposed in an alkyl group.alkylene group, an alkenyl group.alkenylene group, or an alkynyl group.alkynylene group, or a ring structure may be formed with an alkyl group.alkylene group, an alkenyl group-alkenylene group, or an alkynyl group.alkynylene group. When an aryl group, a heterocyclic group, or the like is included, an aryl group, a heterocyclic group, or the like may be a single ring or a fused ring or may be substituted in the same manner or may be unsubstituted.

(Electrolyte Salt [Supporting Electrolyte])

An electrolyte salt (a supporting electrolyte) may be contained in the solid electrolyte composition according to the invention. As the electrolyte salt, a lithium salt is preferable. As the lithium salt, a lithium salt that is generally used in a product of this type is preferable, and the type of the lithium salt is not particularly limited, but lithium salts described below are preferable.

(L-1) Inorganic lithium salt: An inorganic fluoride salt such as $LiPF_6$, $LiBF_4$, $LiAsF_6$, and $LiSbF_6$; a perhalogen acid salt such as $LiClO_4$, $LiBrO_4$, and $LiIO_4$; an inorganic chloride salt such as $LiAlCl_4$; and the like.

(L-2) Fluorine-containing organic lithium salt: a perfluoroalkane sulfonic acid salt such as $LiCF_3SO_3$; a perfluoroalkane sulfonylimide salt such as $LiN(CF_3SO_2)_2$, $LiN(CF_3CF_2SO_2)_2$, $LiN(FSO_2)_2$, and $LiN(CF_3SO_2)(C_4F_9SO_2)$; a perfluoroalkane sulfonylmethide salt such as $LiC(CF_3SO_2)_3$; a fluoroalkyl fluoride phosphoric acid salt such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$; and the like.

(L-3) Oxalatoborate salt: lithium bis(oxalato)borate, lithium difluorooxalatoborate, and the like.

Among these, $LiPF_6$, $LiBF_4$, $LiAsF_6$, $LiSbF_6$, $LiClO_4$, $Li(Rf^1SO_3)$, $LiN(Rf^1SO_2)_2$, $LiN(FSO_2)_2$, and $LiN(R^1SO_2)(Rf^2SO_2)$ are preferable, and a lithiumimide salt such as $LiPF_6$, $LiBF_4$, $LiN(Rf^1SO_2)_2$, $LiN(FSO_2)_2$, and $LiN(Rf^1SO_2)(Rf^2SO_2)$ is still more preferable. Here, $Rf^1$ and $Rf^2$ each represent a perfluoroalkyl group.

The content of the lithium salt is preferably 0.1 parts by mass or greater and more preferably 0.5 parts by mass or greater with respect to 100 parts by mass of the solid electrolyte. The upper limit is preferably 10 parts by mass or less and more preferably 5 parts by mass or less.

The electrolyte used in the electrolyte solution may be used singly or two or more types thereof may be arbitrarily used in combination.

(Dispersion Medium)

In the solid electrolyte composition according to the invention, the dispersion medium in which the respective components are dispersed may be used. When the all-solid-state secondary battery is produced, it is preferable that the solid electrolyte composition is caused to be a paste form by adding a dispersion medium to the solid electrolyte composition, in order to evenly apply the solid electrolyte composition so as to form a film. When the solid electrolyte layer of the all-solid-state secondary battery is formed, the dispersion medium is removed by drying.

Examples of the dispersion medium include a water soluble or water insoluble organic solvent. Specific examples thereof include the followings.

Alcohol compound solvent

Methyl alcohol, ethyl alcohol, 1-propyl alcohol, 2-propyl alcohol, 2-butanol, ethylene glycol, propylene glycol, glycerine, 1,6-hexanediol, cyclohexanediol, sorbitol, xylitol, 2-methyl-2,4-pentanediol, 1,3-butanediol, 1,4-butanediol, and the like Ether compound solvent (including hydroxy group-containing ether compound)

Dimethyl ether, diethyl ether, diisopropyl ether, dibutyl ether, t-butylmethyl ether, cyclohexylmethyl ether, anisole, tetrahydrofuran, alkylene glycol alkyl ether (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, diethylene glycol monobutyl ether, or the like)

Amide compound solvent

N,N-dimethylformamide, 1-methyl-2-pyrrolidone, 2-pyrrolidinone, 1,3-dimethyl-2-imidazolidinone, 2-pyrrolidinone, ε-caprolactam, formamide, N-methylformamide, acetoamide, N-methylacetoamide, N,N-dimethylacetoamide, N-methylpropanamide, hexamethylphosphoric triamide, and the like Ketone compound solvent Acetone, methyl ethyl ketone, methyl isobutyl ketone, cyclohexanone, or the like Aromatic compound solvent Benzene, toluene, or the like Aliphatic compound solvent Hexane, heptane, cyclohexane, methylcyclohexane, octane, pentane, cyclopentane, or the like Nitrile compound solvent Acetonitrile According to the invention, among these, it is preferable to use an ether compound solvent, a ketone compound solvent, an aromatic compound solvent, and an aliphatic compound solvent. With respect to the dispersion medium, the boiling point in the normal pressure (1 atmospheric pressure) is preferably 50° C. or greater and more preferably 80° C. or greater. The upper limit thereof is preferably 220° C. or less and more preferably 180° C. or less. The dispersion medium may be used singly or two or more types thereof may be used in combination.

According to the invention, the amount of the dispersion medium in the solid electrolyte composition can be caused to be an arbitrary amount in the balance between viscosity and a dry load of the solid electrolyte composition. Generally, the amount of the dispersion medium is preferably 20 to 99 weight % in the solid electrolyte composition.

(Positive Electrode Active Substance)

The positive electrode active substance may be contained in the solid electrolyte composition, such that a positive electrode active substance layer is formed. In this manner, a composition for a positive electrode material can be made. Transition metal oxide is preferably used in the positive electrode active substance. Among them, transition metal oxide having a transition element $M^a$ (1 type or more elements selected from Co, Ni, Fe, Mn, Cu, and V) is preferable. A mixed element $M^b$ (an element in Group 1 (Ia) of the periodic table of metal other than lithium, an element in Group 2 (IIa), Al, Ga, In, Ge, Sn, Pb, Sb, Bi, Si, P, B, and the like) may be mixed. Examples of this transition metal oxide include a specific transition metal oxide including oxide expressed by any one of Formulae (MA) to (MC) below or include $V_2O_5$ and $MnO_2$, as additional transition metal oxide. A particle-state positive electrode active substance may be used in the positive electrode active substance. Specifically, it is possible to use a transition metal oxide to which a lithium ion can be reversibly inserted or released, but it is preferable to use the specific transition metal oxide described above.

Examples of the transition metal oxide suitably include oxide including the transition element $M^a$. At this point, the mixed element $M^b$ (preferably Al) and the like are mixed. The mixture amount is preferably 0 to 30 mol % with respect to the amount of the transition metal. It is more preferable that the transition element obtained by synthesizing elements such that the molar ratio of Li/$M^a$ becomes 0.3 to 2.2.

[Transition Metal Oxide Expressed by Formula (MA) (Layered Rock Salt Structure)]

As the lithium-containing transition metal oxide, metal oxide expressed by the following formula is preferable.

$$Li_a M^1 O_b \tag{MA}$$

In the formula, $M^1$ has the same as Ma above, a represents 0 to 1.2 (preferably 0.2 to 1.2) and preferably represents 0.6 to 1.1. b represents 1 to 3, and preferably 2. A portion of $M^1$ may be substituted with the mixed element $M^b$. The transition metal oxide expressed by Formula (MA) above typically has a layered rock salt structure.

The transition metal oxide according to the invention is more preferably expressed by the following formulae.

$$Li_g CoO_k \tag{MA-1}$$

$$Li_g NiO_k \tag{MA-2}$$

$$Li_g MnO_k \tag{MA-3}$$

$$Li_g Co_j Ni_{1-j} O_k \tag{MA-4}$$

$$Li_g Ni_j Mn_{1-j} O_k \tag{MA-5}$$

$$Li_g Co_j Ni_i Al_{1-j-i} O_k \tag{MA-6}$$

$$Li_g Co_j Ni_i Mn_{1-j-i} O_k \tag{MA-7}$$

Here, g has the same meaning as a above. j represents 0.1 to 0.9. i represents 0 to 1. However, 1-j-i becomes 0 or greater. k has the same meaning as b above. Specific examples of the transition metal compound include $LiCoO_2$ (lithium cobalt oxide [LCO]), $LiNi_2O_2$ (lithium nickel oxide), $LiNi_{0.85}Co_{0.33}Al_{0.05}O_2$ (lithium nickel cobalt aluminum oxide [NCA]), $LiNi_{0.33}Co_{0.33}Mn_{0.33}O_2$ (lithium nickel cobalt manganese oxide [NMC]), and $LiNi_{0.5}Mn_{0.5}O_2$ (lithium manganese oxide).

Though partially overlapped, if the transition metal oxide expressed by Formula (MA) is indicated by changing the indication, the following are also provided as preferable examples.

(i) $Li_g Ni_x Mn_y Co_z O_2$ (x>0.2, y>0.2, z≥0, x+y+z=1)

Representative Transition Metal Oxide:

$Li_g Ni_{1/3} Mn_{1/3} Co_{1/3} O_2$ $Li_g Ni_{1/2} Mn_{1/2} O_2$ (ii) $Li_g Ni_x Co_y Al_z O_2$ (x>0.7, y>0.1, 0.1>z≥0.05, x+y+z=1)

Representative Transition Metal Oxide:

$Li_g Ni_{0.8} Co_{0.15} Al_{0.05} O_2$

[Transition Metal Oxide Expressed by Formula (MB) (Spinel-Type Structure)]

Among them, as the lithium-containing transition metal oxide, transition metal oxide expressed by Formula (MB) below is also preferable.

$$Li_c M^2{}_2 O_d \qquad (MB)$$

In the formula, $M^2$ has the same meaning as Ma above. c represents 0 to 2 (preferably 0.2 to 2) and preferably represents 0.6 to 1.5. d represents 3 to 5, and preferably represents 4.

The transition metal oxide expressed by Formula (MB) is more preferably transition metal oxide expressed by the following formulae.

$$Li_m Mn_2 O_n \qquad (MB\text{-}1)$$

$$Li_m Mn_p Al_{2-p} O_n \qquad (MB\text{-}2)$$

$$Li_m Mn_p Ni_{2-p} O_{2-p} O_n \qquad (MB\text{-}3)$$

m has the same meaning as c. n has the same meaning as d. p represents 0 to 2. Specific examples of the transition metal compound include $LiMn_2O_4$ and $LiMn_{1.5}Ni_{0.5}O_4$.

Transition metal oxide expressed by the following formulae is also provided as preferable examples of the transition metal oxide expressed by Formula (MB):

$$LiCoMnO_4 \qquad (a)$$

$$Li_2FeMn_3O_8 \qquad (b)$$

$$Li_2CuMn_3O_8 \qquad (c)$$

$$Li_2CrMn_3O_8 \qquad (d)$$

$$Li_2NiMn_3O_8 \qquad (e)$$

Among the above, in view of high capacity and high output, an electrode including Ni is more preferable.

[Transition Metal Oxide Expressed by Formula (MC)]

As the lithium-containing transition metal oxide, lithium-containing transition metal phosphorus oxide is preferably used. Among them, transition metal oxide expressed by Formula (MC) below is also preferable.

$$Li_e M^3 (PO_4)_f \qquad (MC)$$

In the formula, e represents 0 to 2 (preferably 0.2 to 2) and preferably 0.5 to 1.5. f represents 1 to 5 and preferably represents 0.5 to 2.

$M^3$ above represents one or more types of elements selected from V, Ti, Cr, Mn, Fe, Co, Ni, and Cu. $M^3$ above may be substituted with other metal such as Ti, Cr, Zn, Zr, and Nb, in addition to the mixed element $M^b$ above. Specific examples thereof include an olivine-type iron phosphate salt such as $LiFePO_4$ and $Li_3Fe_2(PO_4)_3$, iron pyrophosphates such as $LiFeP_2O_7$, cobalt phosphates such as $LiCoPO_4$, and a monoclinic nasicon-type vanadium phosphate salt such as $Li_3V_2(PO_4)_3$ (vanadium lithium phosphate).

The values of a, c, g, m, and e representing the composition of Li are values that are changed depending on charging and discharging, and are typically evaluated by the values in a stable state when Li is contained. In Formulae (a) to (e) above, the composition of Li is indicated with specific values, but this is changed depending on an operation of the battery in the same manner.

The average particle size of the positive electrode active substance is not particularly limited, but the average particle size is preferably 0.1 µm to 50 µm. In order to cause the positive electrode active substance to have a predetermined particle size, a general pulverizer and a general classifier may be used. The positive electrode active substance obtained by the baking method may be used after being washed with water, an acidic aqueous solution, an alkaline aqueous solution, or an organic dissolving agent.

The concentration of the positive electrode active substance is not particularly limited, but the concentration in the solid electrolyte composition is preferably 20 to 90 mass % and more preferably 40 to 80 mass % with respect to 100 mass % of the solid component.

The positive electrode active substance may be used singly or two or more types thereof may be used in combination.

(Negative Electrode Active Substance)

The solid electrolyte composition according to the invention may be caused to contain the negative electrode active substance so as to form the negative electrode active substance layer. In this manner, a composition for the negative electrode material can be made. As the negative electrode active substance, an active substance to which a lithium ion can be reversibly inserted or released is preferable. The material is not particularly limited, and examples thereof include carbonaceous material, metal oxide or metal composite oxide such as tin oxide and silicon oxide, a single substance of lithium, a lithium alloy such as a lithium aluminum alloy, and metal that can form an alloy with lithium such as Sn or Si. Among these, the carbonaceous material or lithium composite oxide is preferably used in view of credibility. As the metal composite oxide, metal composite oxide that can occlude or release lithium is preferable. The material thereof is not particularly limited, but a material that contains titanium and/or lithium as the constituent component is preferable in view of characteristics at high current density.

The carbonaceous material used as the negative electrode active substance is a material that is substantially made of carbon. Examples thereof include petroleum pitch, natural graphite, artificial graphite such as vapor phase-grown graphite, and a carbonaceous material obtained by baking various synthetic resins such as a PAN-based resin or a furfuryl alcohol resin. Examples thereof further include various carbon fibers such as a PAN-based carbon fiber, a cellulose-based carbon fiber, a pitch-based carbon fiber, a vapor phase-grown carbon fiber, a dehydrated PVA-based carbon fiber, a lignin carbon fiber, a glass-state carbon fiber, and an active carbon fiber, a mesophase microsphere, a graphite whisker, and a flat plate-shaped graphite.

These carbonaceous materials may be divided into a hardly graphitizable carbon material and a graphite-based carbon material according to the degree of graphitization. The carbonaceous material preferably has surface intervals, density, and sizes of crystallite as disclosed in JP1987-22066A (JP-S62-22066A), JP1990-6856A (JP-H2-6856A), and JP1991-45473A (JP-H3-45473A). The carbonaceous material does not have to be a single material, and a mixture of natural graphite and artificial graphite disclosed in JP1993-90844A (JP-H5-90844A), graphite having a coating layer disclosed in JP1994-4516A (JP-H6-4516A), and the like can be used.

As the metal oxide and metal composite oxide that are applied as the negative electrode active substance, amorphous oxide is particularly preferable, and, further, chalcogenide which is a reaction product of a metal element and an element in Group 16 in the periodic table can be preferably used. The expression "amorphous" herein means to have a broad scattering band having a vertex in an area of 20° to 40° in 2θ values in the X-ray diffraction method using CuKα rays, and may have crystalline diffraction lines. The strongest strength of the crystalline diffraction lines seen at 40° to 70° in the 2θ values is preferably 100 times or less and more preferably 5 times or less in the diffraction line intensity in the vertex of a broad scattering band seen at 20° to 40° in the 2θ value, and it is particularly preferable that oxide does not have a crystalline diffraction line.

Among the compound groups made of amorphous oxide and chalcogenide, amorphous oxide and chalcogenide of a metalloid element are more preferable, and an element of Groups 13 (IIIB) to 15 (VB) in the periodic table, a single substance of Al, Ga, Si, Sn, Ge, Pb, Sb, or Bi or oxide made of a combination obtained by combining two or more types thereof, and chalcogenide are particularly preferable. Specific examples of preferable amorphous oxide and chalcogenide preferably include $Ga_2O_3$, $SiO$, $GeO$, $SnO$, $SnO_2$, $PbO$, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, $GeS$, $SnS$, $SnS_2$, $PbS$, $PbS_2$, $Sb_2S_3$, $Sb_2S_5$, and $SnSiS_3$. These may be composite oxide with lithium oxide, for example, $Li_2SnO_2$.

The average particle size of the negative electrode active substance is preferably 0.1 μm to 60 μm. In order to cause the negative electrode active substance to have a predetermined particle size, a well-known pulverizer and a well-known classifier are used. For example, a mortar, a ball mill, a sand mill, a vibrating ball mill, a satellite ball mill, a planetary ball mill, a swirling air stream-type jet mill, and a sieve are suitably used. At the time of pulverizing, wet pulverization in which an organic solvent such as water or methanol coexist may be performed, if necessary. In order to obtain a desired particle diameter, classification is preferably performed. A pulverization method is not particularly limited, and a sieve, an air classifier, or the like can be used, if necessary. As the classification, both dry-type classification and wet-type classification can be used.

The chemical formula of the compound obtained by the baking method can be calculated in an inductive coupling plasma (ICP) emission spectrophotometric analysis method as a measuring method or can be calculated from a mass difference between particles before and after baking, as a simple method.

Examples of the negative electrode active substance that can be used together with an amorphous oxide negative electrode active substance mainly using Sn, Si, and Ge suitably include a carbon material that can occlude and release lithium ion, lithium metal or lithium, lithium alloy, or metal that can be formed to an alloy with lithium.

The negative electrode active substance preferably contains a titanium atom. More specifically, since the volume of $Li_4Ti_5O_{12}$ is small when a lithium ion is occluded and released, quick charging-discharging properties are excellent, the deterioration of the electrode is prevented, and the lifespan of the lithium ion secondary battery can be improved. Therefore, $Li_4Ti_5O_{12}$ is preferable. Stability of the secondary battery in various use condition improves due to the combination between a specific negative electrode and a further specific electrolyte solution.

The concentration of the negative electrode active substance is not particularly limited, but the concentration in the solid electrolyte composition is preferably 10 to 80 mass % and more preferably 20 to 70 mass % with respect to 100 mass % of the solid component.

The embodiment above has been described, considering an example in which a positive electrode active substance and a negative electrode active substance is contained in the solid electrolyte composition, but the invention is not limited to thereto. For example, a paste including a positive electrode active substance and a negative electrode active substance as the composition that does not include the nitrogen-containing polymer may be prepared. At this point, it is preferable to contain the inorganic solid electrolyte layer. In this manner, the positive electrode material and the negative electrode material which are commonly used are combined, and the solid electrolyte composition relating to the preferable embodiment of the invention may be used to form an inorganic solid electrolyte layer. The conductive assistance may be suitably contained in the active substance layer of the positive electrode and the negative electrode, if necessary. General examples of the electron conductive material include a carbon fiber, such as graphite, carbon black, acetylene black, Ketjen black, and a carbon nanotube, metal powders, a metal fiber, and a polyphenylene derivative.

The negative electrode active substance may be used singly or two or more types thereof may be used in combination.

<Collector (Metallic Foil)>

It is preferable that an electron conductor that does not cause a chemical change is used as the collector of the positive-negative electrodes. As the collector of the positive electrode, in addition to aluminum, stainless steel, nickel, titanium, and the like, a product obtained by treating carbon, nickel, titanium, or silver on the surface of aluminum and stainless steel is preferable. Among them, aluminum and an aluminum alloy are more preferable. As the negative electrode collector, aluminum, copper, stainless steel, nickel, and titanium are preferable, and aluminum, copper, and a copper alloy are more preferable.

As the form of the collector, a sheet-shaped collector is commonly used, but a net, a punched collector, a lath body, a porous body, a foam body, a molded body of a fiber group, and the like can be used. The thickness of the collector is not particularly limited, but the thickness is preferably 1 μm to 500 μm. Unevenness is preferably formed on the collector surface by a surface treatment.

<Producing of all-Solid-State Secondary Battery>

Producing of the all-solid-state secondary battery may be performed by the common method. Specifically, examples of the method include a method of making an electrode sheet for batteries on which a film is formed by applying the solid electrolyte composition above on a metallic foil that becomes a collector. For example, the composition that forms the positive electrode material is applied on the metallic foil so as to form the film. Subsequently, the composition of the inorganic solid electrolyte is applied on the upper surface of the positive electrode active substance layer of the electrode sheet for the battery so as to form the film. In the same manner, it is possible to obtain a desired structure of the all-solid-state secondary battery by forming the film of the active substance of the negative electrode and providing the collector (metallic foil) on the negative electrode side. The method of applying the respective compositions may be performed by the common method. At this point, after the composition for forming the positive electrode active substance layer, the composition for forming the inorganic solid electrolyte layer, and the composition for forming the negative electrode active substance layer are respectively applied, it is preferable to perform the heating treatment. The heating temperature is not particularly limited, but is preferably 30° C. or greater and more preferably 60° C. or greater. The upper limit thereof is preferably 300° C. or less and more preferably 250° C. or less. If the heating is performed in this temperature range, the nitrogen-containing polymer can be suitably softened. Accordingly, with respect to the all-solid-state secondary battery, favorable binding properties and ion conductivity under the non-pressurization can be obtained.

<Use of all-Solid-State Secondary Battery>

The all-solid-state secondary battery according to the invention can be applied to various uses. The use embodiment is not particularly limited, but, if the all-solid-state secondary battery is mounted in an electronic device, examples thereof include a notebook personal computer, a pen input personal computer, a mobile computer, an electron book player, a cellular phone, a cordless phone slave unit, a pager, a handy terminal, a portable fax machine, a portable copying machine, a portable printer, a headphone stereo, a video movie, a liquid crystal television, a handy cleaner, a portable CD, a mini disc, an electric shaver, a transceiver, an electronic organizer, a calculator, a memory card, a portable tape recorder, radio, a backup power supply, and a memory card. Examples of additional consumer use include an automobile, an electric motor vehicle, a motor, lighting equipment, a toy, a game machine, a load conditioner, a clock, a stroboscope, a camera, and medical equipment (a pacemaker, a hearing aid, and a shoulder massager). The all-solid-state secondary battery can be used for military or space. The all-solid-state secondary battery can be combined with a solar battery.

Among these, the all-solid-state secondary battery is preferably applied to an application that requires discharging properties at high capacity and a high rate. For example, in an electric storage facility and the like in which high capacity enhancement is expected in the future, high credibility is necessary, and thus compatibility between battery properties is required. A high capacity secondary battery is mounted on an electric car and the like, a use in which charging is performed everyday at home is assumed, and credibility at overcharging is further required. According to the invention, an excellent effect can be achieved suitably in response to these use embodiments.

According to the preferable embodiment of the invention, respective applications as follows are provided.

A solid electrolyte composition (a composition for electrodes of a positive electrode or a negative electrode) that includes an active substance that can insert or release ion of metal belonging to Group 1 or 2 of the periodic table.

An electrode sheet for batteries obtained by forming a film of a solid electrolyte composition on a metallic foil.

An all-solid-state secondary battery including a positive electrode active substance layer, a negative electrode active substance layer, and an inorganic solid electrolyte layer, in which at least one of the positive electrode active substance layer, the negative electrode active substance layer, or the inorganic solid electrolyte layer is a layer formed of a solid electrolyte composition.

A manufacturing method of an electrode sheet for batteries by disposing the solid electrolyte composition on a collector, and performing heating at a predetermined temperature.

An all-solid-state secondary battery manufacturing method of an all-solid-state secondary battery in the manufacturing method of an electrode sheet for batteries.

The all-solid-state secondary battery refers to a secondary battery that is formed of a positive electrode, a negative electrode, and an electrolyte which are all solid. In other words, the all-solid-state secondary battery is different from an electrolyte solution-type secondary battery in which a carbonate-based solvent is used as an electrolyte. Among these, the invention relates to an inorganic all-solid-state secondary battery. The all-solid-state secondary battery is classified into the organic (polymer) all-solid-state secondary battery using a polymer compound such as polyethylene oxide as an electrolyte and the inorganic all-solid-state secondary battery using LLT, LLZ, or the like. A polymer compound can be applied as binders of the positive electrode active substance, the negative electrode active substance, and the inorganic solid electrolyte particle, without preventing application to an inorganic all-solid-state secondary battery.

The inorganic solid electrolyte is different from the electrolyte (polymer electrolyte) using a polymer compound as an ion conducting medium and the inorganic compound becomes an ion conducting medium. Specific examples thereof include LLT or LLZ above. The inorganic solid electrolyte itself does not release a positive ion (Li ion), but exhibits an ion transporting function. In contrast, an electrolyte solution or a material that becomes a supply source of an ion that is added to a solid electrolyte layer and releases a positive ion (Li ion) is called an electrolyte, but when the electrolyte is differentiated from the electrolyte as the ion transferring material, the electrolyte is called an "electrolyte salt" or a "supporting electrolyte". Examples of the electrolyte salt include lithium bistrifluoromethane sulfone imide (LiTFSI).

In this specification, the expression "composition" means a mixture in which two or more components are evenly mixed. However, evenness may be substantially maintained, and aggregation or uneven distribution may partially occur in a range in which a desired effect is exhibited. Particularly, the solid electrolyte composition basically refers to a composition (typically a paste form) that becomes a material for forming an electrolyte layer, an electrolyte layer formed by hardening this composition is not included to this.

EXAMPLES

Hereinafter, the invention is specifically described with reference to examples, but the invention is not limited thereto. In the examples below, the expressions "part" and "%" are on a mass basis, unless otherwise described.

In examples, the acid value and the amine value were determined by a potential difference method (solvent: tetrahydrofuran/water=100/10 (volume ratio), titration liquid: 0.01 N sodium hydroxide aqueous solution (acid value), 0.01 N hydrochloric acid aqueous solution (amine value)).

The compositional ratios of the respective compounds of synthesization examples are sequentially provided from the compositional ratios in the structure described on the left side of the respective compounds.

Synthesization Example 1

Synthesization of Exemplary Compound (A-64)

10 g of polyethyleneimine (SP-018, number average molecular weight: 1,800, manufactured by Nippon Shokubai Co., Ltd.) and 3.2 g of n-iodinedodecane are added and heated at 120° C. for three hours. The obtained polymer solution was reprecipitated in hexane, so as to obtain Exemplary compound (A-64). The compositional ratio in an amine value of 0.81 mmol/g by 1HNMR was 34 mol %/66 mol %. The number average molecular weight by the GPC method was 14,000.

Synthesization Example 2

Synthesization of Exemplary Compound (A-65)

12 g of polyethyleneimine (SP-018, number average molecular weight: 1,800, manufactured by Nippon Shokubai Co., Ltd.), 0.12 g of p-methoxyphenol, and 5.5 g of stearyl acrylate were added and heated at 80° C. for five hours. The obtained polymer solution was reprecipitated in hexane/methanol=9/1, so as to obtain Exemplary compound (A-65). The compositional ratio in an amine value of 0.73 mmol/g by 1HNMR was 54 mol/o/46 mol %. The number average molecular weight by the GPC method was 16,000.

Synthesization Example 3

Synthesization of Exemplary Compound (A-66)

15 g of polyethyleneimine (SP-018, number average molecular weight: 1,800, manufactured by Nippon Shokubai Co., Ltd.), 0.11 g of p-methoxyphenol, and 8.1 g of BLEMMER AE-400 [number average molecular weight: 500] (manufactured by NOF Corporation) were added and heated at 80° C. for three hours. The obtained polymer solution was reprecipitated in hexane/isopropanol=8/2, so as to obtain Exemplary compound (A-66). The compositional ratio in an amine value of 0.43 mmol/g by 1HNMR was 73 mol %/o/27 mol %. The number average molecular weight by the GPC method was 23,000.

Synthesization Example 4

Synthesization of Exemplary Compound (A-75)

10 g of PAA-08 (polyallylamine (manufactured by Nitto Boseki Co., Ltd.) weight-average molecular weight: 8,000), 0.10 g of p-methoxyphenol, 4.3 g of BLEMMER AE-400 [number average molecular weight: 500] (manufactured by NOF Corporation), and 0.9 g of methyl acrylate were added and heated at 80° C. for three hours. The obtained polymer solution was reprecipitated in hexane, so as to obtain Exemplary compound (A-75). The compositional ratio in an amine value of 0.53 mmol/g by 1HNMR was 31 mol %/27 mol %/42 mol %. The number average molecular weight by the GPC method was 24,000.

Synthesization Example 5

Synthesization of Exemplary Compound (A-76)

16 g of polyethyleneimine (SP-018, number average molecular weight: 1,800, manufactured by Nippon Shokubai Co., Ltd.), 0.11 g of p-methoxyphenol, and 2.1 g of BLEMMER AE-400 [number average molecular weight: 500] (manufactured by NOF Corporation) were added and heated at 80° C. for three hours. Thereafter, cooling was performed to 65° C., 20 g of propylene glycol 1-monomethyl ether 2-acetate (hereinafter, referred to as PGMEA) containing 3.8 g of succinic anhydride as an X precursor x was slowly added and stirred for two hours. The obtained polymer solution was reprecipitated in hexane/isopropanol=8/2, so as to obtain Exemplary compound (A-76). When amine value titration and acid value titration were performed, it was possible to check that an amine value was 0.52 mmol/g and an acid value was 0.52 mmol/g, and further the compositional ratio by 1HNMR was 36 mol %/33 mol %/31 mol %. The number average molecular weight by the GPC method was 18,000.

Synthesization Example 6

Synthesization of Exemplary Compound (A-77)

13 g of polyethyleneimine (SP-018, number average molecular weight: 1,800, manufactured by Nippon Shokubai Co., Ltd.), 0.2 g of p-methoxyphenol, and 3.2 g of X-22-2475 [number average molecular weight: 420] (manufactured by Shin-Etsu Chemical Co., Ltd.) were added and heated at 80° C. for three hours. Thereafter, cooling was performed to 65° C., 20 g of propylene glycol 1-monomethyl ether 2-acetate (hereinafter, referred to as PGMEA) containing 1.8 g of succinic anhydride as the X precursor x was slowly added and stirred for two hours. The obtained polymer solution was reprecipitated in hexane/methanol=9/1, so as to obtain Exemplary compound (A-77). When the acid value titration was performed, it was possible to check that an acid value was 0.27 mol/g, and further the compositional ratio by 1HNMR was 23 mol %/35 mol %/42 mol %. The number average molecular weight by the GPC method was 21,000.

Synthesization Example 7

Synthesization of Exemplary Compound (A-78)

16 g of polyethyleneimine (SP-018, number average molecular weight: 1,800, manufactured by Nippon Shokubai Co., Ltd.), 0.1 g of p-methoxyphenol, and 5.2 of R-1620 [number average molecular weight: 420] (manufactured by Daikin Industries, Ltd.) were added and heated at 80° C. for three hours. Thereafter, cooling was performed to 65° C., and 20 g of propylene glycol 1-monomethyl ether 2-acetate (hereinafter, referred to as PGMEA) containing 0.8 g of succinic anhydride as the X precursor x was slowly added for two hours. The obtained polymer solution was reprecipitated in hexane/methanol=9/1, so as to obtain Exemplary compound (A-78). When the acid value titration was performed, it was possible to check that an acid value was 0.13 mol/g, and further the compositional ratio by 1HNMR was 5 mol %/78 mol %/17 mol %. The number average molecular weight by the GPC method was 13,000.

Synthesization Example 8

Synthesization of Exemplary Compound (A-79)

10 g of polyethyleneimine (SP-018, number average molecular weight: 1,800, manufactured by Nippon Shokubai Co., Ltd.) and 3.5 g of perfluorooctanoate were added and heated at 120° C. for three hours. Thereafter, cooling was performed to 65° C., 20 g of propylene glycol 1-monomethyl ether 2-acetate (hereinafter, referred to as PGMEA) containing 1.8 g of succinic anhydride as the X precursor x was slowly added and stirred for two hours. Thereafter, PGMEA was added and reprecipitated in hexane, and blast drying was performed, so as to obtain a resin (A-79). When the acid value titration was performed, it was possible to check that an acid value was 0.22 mmol/g, and further the compositional ratio by 1HNMR was 19 mol %/50 mol %/3 mol %/28 mol %. The number average molecular weight by the GPC method was 25,000.

Synthesization Example 9

Synthesization of Polyester (i-1)

6.4 g of n-octanoate, 200 g of ϵ-caprolactone, and 5 g of titanium (IV) tetrabutoxide were mixed, heated at 160° C. for eight hours, and cooled to room temperature, so as to obtain Polyester (i-1).

A scheme was represented below.

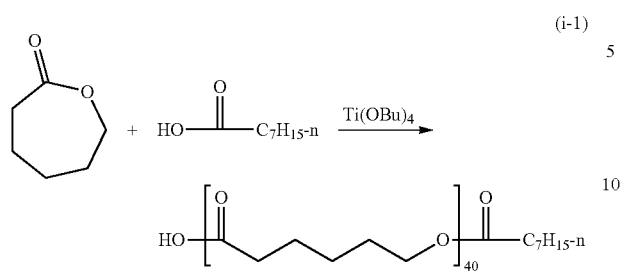

[Synthesization of Exemplary Compound (A-80)]

10 g of polyethyleneimine (SP-018, number average molecular weight: 1,800, manufactured by Nippon Shokubai Co., Ltd.) and 100 g of Polyester (i-1) as a Y precursor y were mixed and heated at 120° C. for three hours, so as to obtain Intermediate (Aa'-80). Thereafter, cooling was performed to 65° C., and 200 g of propylene glycol 1-monomethyl ether 2-acetate (hereinafter, referred to as PGMEA) containing 3.8 g of succinic anhydride as the X precursor x was slowly added and stirred for two hours. Thereafter, PGMEA was added and reprecipitated in hexane, and blast drying was performed, so as to obtain a resin (A-80). The resin (A-80) had a group having a side chain derived from Polyester (i-1) and a functional group (carboxyl group) being derived from succinic anhydride and having pKa of 14 or less.

The synthesization scheme is represented below.

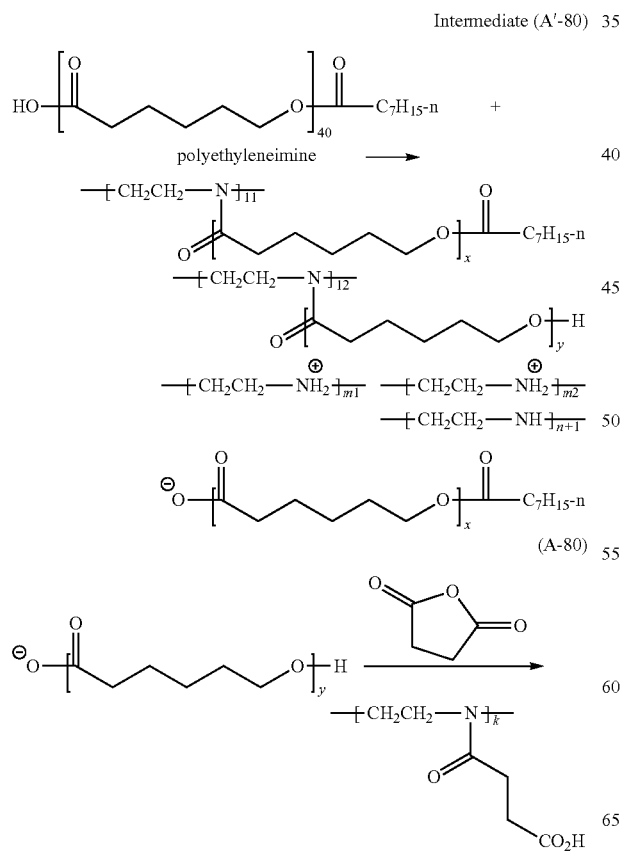

When acid value titration of Intermediate (A'-80) was performed, it was possible to check that an acid value was 0.11 mmol/g. When the amine value titration and the acid titration of the resin (A-80) were performed, the acid value was 0.31 mmol/g and the amine value was 0.83 mmol/g. That is, k (=mol % of a repeating unit corresponding to Formula (A-80)) was able to be calculated from the difference between the acid value of the resin (A-80) and the acid value of Intermediate (A'-80), $(l_1+l_2)$ (=mol % of a repeating unit corresponding to Formula (1-3)) was able to be calculated from the difference between the amine value of the resin (A-80) and the number of nitrogen atoms of the resin before reaction, and $(m_1+m_2)$ (=mol % of a repeating unit corresponding to Formula (1-2)) was able to be calculated from an acid value of Intermediate (A'-80), such that $k/(l_1+l_2)/(m_1+m_2)/n=10/50/5/35$ was satisfied. x and y of (A-80) was all 40.

That is, it was possible to know that the resin included 10 mol % of a repeating unit in which X was —COCH$_2$CH$_2$CO$_2$H in the repeating unit represented by Formula (1-2) and 50 mol % of a repeating unit in which $Y^1$ was poly(ε-caprolactone) in the repeating unit represented by Formula (1-3). The number average molecular weight by the GPC method was 22,000.

Synthesization Example 10

Synthesization of Exemplary Compound (A-47)

30 mL of diethylene glycol dimethyl ether was added to a 500 mL three-necked flask, and heated to 80° C. under nitrogen stream. A mixed solution of 30.5 g of 2-aminoethyl methacrylate, 0.36 g of an azo-based radical polymerization initiator V-601 (manufactured by Wako Pure Chemical Industries, Ltd.), and 100 mL of diethylene glycol dimethyl ether was dropwisely added over two hours and further heated and stirred for six hours. 5.5 g of stearic acid was added to the obtained polymer solution and heated and stirred at 120° C. for three hours. Reprecipitation was performed in hexane/methanol=9/1, and blast drying was performed, so as to obtain a resin (A-47). When the acid value titration was performed, it was checked that the acid value was 0.34 mmol/g, and further the compositional ratio by 1HNMR was 83 mol %/12 mol %/5 mol %. The number average molecular weight by the GPC method was 23,000.

Synthesization Example 11

Synthesization of Polyester (i-2)

In the same manner as Synthesization example 9, Polyester (i-2) was synthesized by using undecanoic acid instead of octanoate.

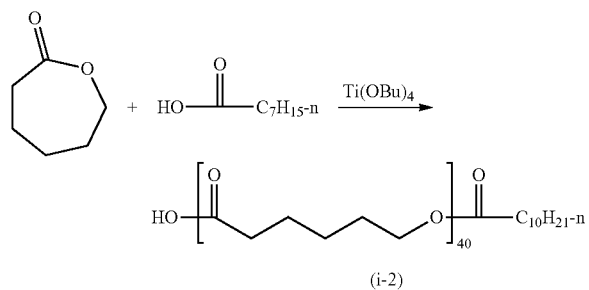

(i-2)

Synthesization of Polyester (i-3)

In the same manner as Synthesization example 9, Polyester (i-3) was synthesized by using 2-hydroxyethyl acrylate instead of octanoate. The length of polyester was able to be appropriately synthesized by adjusting a feed ratio of ε-caprolactone and alcohol.

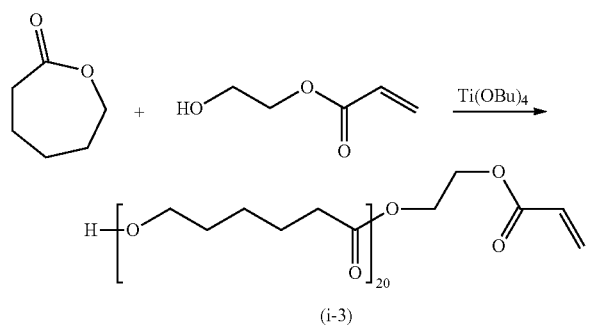

(i-3)

[Synthesization of Exemplary Compound (A-57)]

13 g of polyethyleneimine (SP-018, molecular weight: 1,800, manufactured by Nippon Shokubai Co., Ltd.), 39 g of Polyester (i-3), and 0.5 g of p-methoxyphenol were mixed and heated at 60° C. for three hours. Thereafter, Polyester (i-2) was added and heated at 120° C. for three hours. Thereafter, cooling was performed to 65° C., and 200 g of propylene glycol 1-monomethyl ether 2-acetate (hereinafter, referred to as PGMEA) containing 5.8 g of succinic anhydride as the X precursor x was slowly added and stirred for two hours. Thereafter, PGMEA was added, reprecipitation was performed in hexane, and blast drying was performed, so as to obtain a resin (A-57). The resin (A-57) has a group having side chains derived from Polyester (i-2) and (i-3) and a functional group (carboxyl group) being derived from succinic anhydride and having pKa of 14 or less.

The acid value of the obtained polymer was 0.22 mmol/g, and the amine value was 0.43 mmol/g. The compositional ratio was k/l/m/n=20/32/34/14 mol %, and the number average molecular weight by the GPC method was 25,000.

Preparing of solid electrolyte composition 180 zirconia beads having a diameter of 5 mm were put into a zirconia 45 mL container (manufactured by Fritsch Japan Ltd.), 9.0 g of an inorganic solid electrolyte LLT (manufactured by Toshima Manufacturing Co., Ltd.), 2.7 g of 30% polymer solution (solid content: 0.8 g) of Exemplary compound (A-64), and 0.2 g of LiTFSI (manufactured by Sigma-Aldrich Co., Llc.) were added, 15.0 g of tetrahydrofuran (THF) as a dispersion medium was put, the container was set to a planetary ball mill P-7 manufactured by Fritsch Japan Ltd., and mixing was continued at the rotation speed of 300 rpm for two hours, so as to obtain a solid electrolyte composition S-1. The other exemplary solid electrolyte compositions were prepared in the same manner (see Table 2 below).

TABLE 2

| Composition | Solid Electrolyte | Nitrogen-containing polymer | | Lithium salt | | Dispersion medium |
|---|---|---|---|---|---|---|
| S-1 | LLT | 90 | (A-64) | 8 | LiTFSI | 2 | THF |
| S-2 | LLT | 95 | (A-64) | 4 | LiTFSI | 1 | THF |
| S-3 | LLT | 95 | (A-64) | 5 | — | — | THF |
| S-4 | LLZ | 95 | (A-65) | 4 | LiTFSI | 1 | PGMEA |
| S-5 | LLZ | 95 | (A-66) | 4 | LiTFSI | 1 | Dioxane |
| S-6 | LLZ | 95 | (A-75) | 4 | LiTFSI | 1 | MEK |
| S-7 | LLZ | 95 | (A-76) | 4 | LiTFSI | 1 | Toluene |
| S-8 | LLZ | 95 | (A-77) | 4 | LiTFSI | 1 | Toluene |
| S-9 | LLZ | 95 | (A-78) | 4 | LiTFSI | 1 | Heptane |
| S-10 | LLZ | 95 | (A-79) | 5 | — | — | Dibutyl ether |
| S-11 | LLZ | 95 | (A-80) | 5 | — | — | Dibutyl ether |
| S-12 | LLT | 95 | PEI-OA | 5 | — | — | THF |
| T-1 | — | 0 | Polyethyleneimine | 80 | LiTFSI | 20 | Methanol |
| T-2 | — | 0 | Ethylene oxide-modified polyethyleneimine | 80 | LiTFSI | 20 | Acetonitrile |
| T-3 | LLT | 75 | PEO | 23 | LiTFSI | 2 | THF/NMP |
| T-4 | LLT | 75 | HSBR | 23 | LiTFSI | 2 | Toluene |

<Explanatory Notes in Table>
Numbers in the table was mass ratios (%)
LLT: $Li_{0.33}La_{0.55}TiO_3$
LLZ: $Li_7La_3Zr_2O_{12}$
PEO: Polyethylene glycol
THF: Tetrahydrofuran
HSBR: Hydrogenated styrene butadiene rubber
PGMEA: Propylene glycol monomethyl ether acetate
NMP: N-methylpyrrolidone
MEK: Methyl ethyl ketone
LiTFSI ($LiN(CF_3SO_2)_2$)
PEI-OA: Polyethyleneimine and amide compound of oleic acid [1:20 in molar ratio] (see Example 1 in JP1992-33263A (JP-H04-33263A))

Preparing of Composition for Positive Electrode of Secondary Battery 100 parts of a positive electrode active substance, 5 parts of acetylene black, 75 parts of the solid electrolyte composition S-1 obtained above, and 270 parts of N-methylpyrrolidone described in Table 3 below were added to a planetary mixer (TK HIVIS mix, manufactured by PRIMIX Corporation), and stirring was performed at 40 rpm for one hour.

Preparing of Composition for Negative Electrode of Secondary Battery 100 parts of a negative electrode active substance, 5 parts of acetylene black, 75 parts of the solid electrolyte composition S-1 obtained above, and 270 parts of N-methylpyrrolidone described in Table 3 below were added to a planetary mixer (TK HIVIS mix, manufactured by PRIMIX Corporation), and stirring was performed at 40 rpm for one hour.

Producing of Positive Electrode for Secondary Battery

The composition for the positive electrode of the secondary battery obtained above was applied on an aluminum foil having a thickness of 20 μm with an applicator having arbitrary clearance, and heating was performed for 1 hour at 80° C. and further performed for 1 hour at 110° C., so as to dry the applied composition. Thereafter, heating and pressurizing were performed by using a heat press machine so as to have an arbitrary density, such that a positive electrode for a secondary battery was obtained.

Producing of Electrode Sheet for Secondary Battery

The solid electrolyte composition obtained above was applied on the positive electrode for the secondary battery obtained above with an applicator having arbitrary clearance, and heating was performed for 1 hour at 80° C. and further performed for 1 hour at 110° C., so as to dry the solid electrolyte composition. Thereafter, the composition for the negative electrode of the secondary battery obtained above was applied, heating was performed for 1 hour at 80° C. and further performed for 1 hour at 110° C., so as to dry the composition. A copper foil having the thickness of 20 μm was matched on the negative electrode layer, heating and pressurization were performed to have arbitrary density by using a heating and pressing machine, so as to obtain an electrode sheet for a secondary battery of Test No. 102.

<Evaluation of Binding Properties>

In a step of producing a secondary electrode sheet for batteries, binding properties were evaluated by using a electrode sheet in a state before the composition for the negative electrode was applied (a state in which the solid electrolyte composition was dried). When an adhesive tape (cellophane tape ("CT24", manufactured by Nichiban Co., Ltd.)) was adhered to the surface of the hardened solid electrolyte composition and the adhesive tape was removed at a predetermined speed, a peeled area was visually checked. A ratio of an area in a portion which was not peeled was evaluated as below.

A: 100%
B: 95% or greater and less than 100%
C: 80% or greater and less than 95%
D: 50% or greater and less than 80%
E: Less than 50%

<Temporal Stability Evaluation>

With respect to an electrode sheet right after the production, a change of the ion conductivity of the electrode sheet after 72 hours had elapsed at a constant temperature and constant humidity of 25° C. and 50% was represented.

A: A degree of reduction was 0%
B: A degree of reduction was greater than 0% and less than 10%
C: A degree of reduction was 10% or greater and less than 30%
D: A degree of reduction was 30% or greater and less than 70%
E: A degree of reduction was 70% or greater <Measuring of Ion Conductivity>

A coin battery was produced by cutting the electrode sheet obtained above into a disc shape with a diameter of 14.5 mm and inputting the cut electrode sheet or the cut secondary battery electrode sheet to a stainless steel 2032-type coin case combined with a spacer or a washer. The coin battery was inserted from the outside of the coin battery in a jig that can apply a pressure between electrodes to be used in the electrochemical measurement. The pressure between the electrodes was 500 kgf/cm$^2$.

Figure 2:
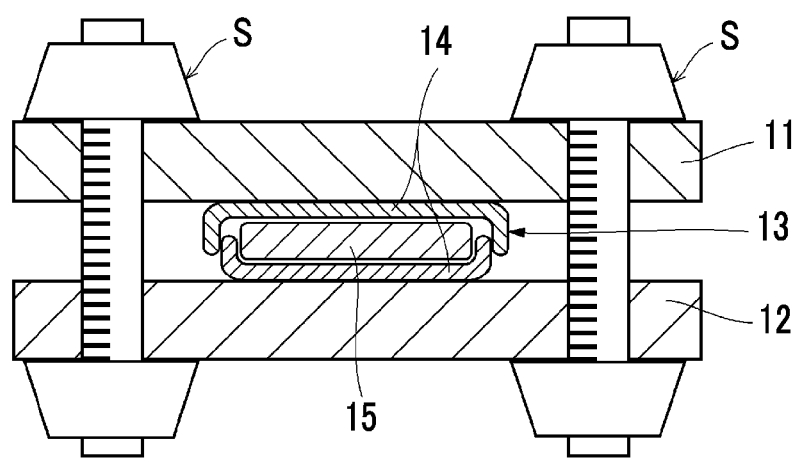
FIG. 2 is a cross-sectional view schematically illustrating a test device used in examples.

The ion conductivity was obtained by using the coin battery obtained above by the alternating current impedance method in the constant-temperature tank of 30° C. At this point, in the pressurization of the battery, the test body illustrated in FIG. 2 was used. Reference numeral 11 refers to an upper support plate, Reference numeral 12 refers to a lower support plate, Reference numeral 13 refers to a coin battery, and Reference numeral S refers to a screw.

The electrode binding properties of the solid electrolyte sheet, measuring results of the ion conductivity in pressurized and non-pressurized states are represented in Table 3. At this point, the measuring in the pressurized state refers to the case where the measuring was performed in a state in which the coin battery was interposed between jigs, and the measuring in the non-pressurized state refers to the case where the measuring was performed with the coin battery as it was.

<Measuring of Molecular Weight>

With respect to the molecular weight of the polymer according to the invention, a molecular weight in terms of a standard polystyrene by the gel permeation chromatography (GPC) was measured. Whether a weight-average or number average is specified everytime. A value was measured basically by the methods of Condition 1 or 2 (priority) as below, as the measuring method. However, according to the types of the polymer, a proper eluent may be appropriately selected to be used.

(Condition 1)
Column: TOSOH TSKgel Super AWM-H was connected.
Carrier: 10 mM LiBr/N-methylpyrrolidone
(Condition 2)
Column: a column obtained by connecting TOSOH TSKgel Super HZM-H, TOSOH TSKgel Super HZ4000, and TOSOH TSKgel Super HZ2000 was used.
Carrier: NMP

TABLE 3

| | Cell constitution | | | Adhe- | Tem- | Ion conductivity (mS/cm) | |
| --- | --- | --- | --- | --- | --- | --- | --- |
| Test No. | Positive electrode | Electrolyte | Negative electrode | sive properties | poral stability | Pressurization | Non-pressurization |
| 101 | — | S-1 (A-64) | — | C | C | 0.17 | 0.15 |
| 102 | LMO S-1 | S-1 (A-64) | LTO S-1 | C | C | 0.1 | 0.09 |
| 103 | LMO S-1 | S-1 (A-64) | Graphite S-1 | C | C | 0.11 | 0.1 |
| 104 | — | S-2 (A-64) | — | B | C | 0.15 | 0.14 |
| 105 | LCO S-2 | S-2 (A-64) | Graphite S-2 | B | C | 0.09 | 0.08 |
| 106 | — | S-3 (A-64) | — | B | C | 0.09 | 0.08 |
| 107 | NMC S-3 | S-3 (A-64) | Graphite S-3 | B | C | 0.06 | 0.06 |
| 108 | — | S-4 (A-65) | — | B | B | 0.17 | 0.17 |
| 109 | NMC S-4 | S-4 (A-65) | LTO S-4 | B | B | 0.11 | 0.11 |
| 110 | — | S-5 (A-66) | — | B | B | 0.21 | 0.21 |
| 111 | LMO S-5 | S-5 (A-66) | LTO S-5 | B | B | 0.20 | 0.20 |
| 112 | LMO S-6 | S-6 (A-75) | LTO S-6 | B | B | 0.16 | 0.15 |
| 113 | LMO S-7 | S-7 (A-76) | LTO S-7 | A | B | 0.22 | 0.21 |
| 114 | LMO S-8 | S-8 (A-77) | LTO S-8 | A | A | 0.18 | 0.17 |
| 115 | LMO S-9 | S-9 (A-78) | LTO S-9 | A | A | 0.17 | 0.16 |
| 116 | LMO S-10 | S-10 (A-79) | LTO S-10 | A | A | 0.19 | 0.18 |
| 117 | LMO S-11 | S-11 (A-80) | LTO S-11 | A | B | 0.19 | 0.18 |
| 118 | LMO S-11 | S-12 PEI-OA | LTO S-11 | C | C | 0.07 | 0.02 |
| c11 | — | T-1 | — | D | D | 0.00042 | 0.00025 |

TABLE 3-continued

| | Cell constitution | | | Adhesive prop- erties | Tem- poral sta- bility | Ion conductivity (mS/cm) | |
|---|---|---|---|---|---|---|---|
| Test No. | Positive elec- trode | Electro- lyte | Nega- tive electrode | | | Pres- sur- ization | Non- pressur- ization |
| c12 | — | T-2 | — | E | D | 0.00061 | 0.00053 |
| c13 | — | T-3 | — | E | E | 0.14 | 0.03 |
| c14 | — | T-4 | — | D | E | 0.09 | 0.03 |

<Explanatory Notes in Table>
Test No.: Test numbers starting with c are comparative examples
LMO; LiMn$_2$O$_4$ lithium manganese oxide
LTO: Li$_4$Ti$_5$O$_{12}$ lithium titanate
(Product name "ENERMIGHT LT-106", manufactured by Ishihara Sangyo Kaisha, Ltd.)
NMC; Li(Ni$_{1/3}$Mn$_{1/3}$Co$_{1/3}$)O$_2$
Nickel, manganese, and lithium cobalt oxide
Graphite: Spherical graphite powder manufactured by Nippon Kokuen Group The positive electrode active substance-negative electrode active substance were changed as in the table above, and measuring was performed in the same manner. An example in which the description of the active substance was not provided means that an electrode sheet from which a negative electrode active substance layer and a positive electrode active substance layer were omitted from the secondary electrode sheet for batteries.

As understood from Table 3, if the nitrogen-containing polymer according to the invention was used, all performances of the binding properties, the stability, and the ion conductivity were excellent. Among these, if a carbonyl group, a carbonyloxy group, and an acid group (carboxyl group) exist in a side chain, binding properties were improved. If a hydrophobic group (silicone, fluorine) exists in a side chain, the deterioration of an inorganic individual electrolyte is suppressed, and it was understood that, thus temporal stability was improved. According to the preferable embodiment of the invention, it was understood that, according to polyether and polyester moieties of a graft portion Y, interaction of lithium ions increases, and thus ion conductivity increased.

With respect to the items as in Table 3, tests using compounds A-47 and A-57 synthesized in the above were performed. Specifically, evaluation tests were performed in the same manner as Test 101, except for substituting the compound A-64 to respective compounds. The results were "A" in the binding properties and "B" in the temporal stability. The ion conductivity had the same results as in Test 101.

The invention is described with reference to specific embodiments, but, unless described otherwise, it is clear that any details of the invention which are not particularly designated are not intended to limit the invention, and it is obvious that the embodiments are widely construed without departing from the spirit and the scope of the invention recited in the accompanying claims.

EXPLANATION OF REFERENCES

1: negative electrode collector
2: negative electrode active substance layer
3: inorganic solid electrolyte layer
4: positive electrode active substance layer
5: positive electrode collector
6: operating site
10: all-solid-state secondary battery
11: upper support plate
12: lower support plate
13: coin battery
S: screw

What is claimed is:
1. An all-solid-state secondary battery comprising:
a positive electrode active substance layer;
a negative electrode active substance layer; and
an inorganic solid electrolyte layer,
wherein at least one layer of the positive electrode active substance layer, the negative electrode active substance layer, or the inorganic solid electrolyte layer contains a nitrogen-containing polymer, which has at least two selected from the group consisting of a repeating unit having a substituent X, a repeating unit having a substituent Y and a repeating unit having a substituent Z described below and an inorganic solid electrolyte having conductivity of ions of metal belonging to Group 1 or 2 in the periodic table,
X is a group containing a functional group having pKa of 14 or less,
Y represents a group having a polymer chain including a hetero atom, and Y may be linked to another nitrogen-containing polymer molecule to form a linking chain, and
Z represents a group having an alkyl group having 1 to 30 carbon atoms, a group having a halogenated alkyl group having 1 to 30 carbon atoms, or a group having a silicone chain having 1 to 100 silicon atoms.
2. The all-solid-state secondary battery according to claim 1,
wherein the nitrogen-containing polymer has repeating units represented by any two of Formulae (1-1) to (1-3) or repeating units represented by any two of Formulae (2-1) to (2-3) below,

(1-1)

(1-2)

(1-3)

(2-1)

(2-2)

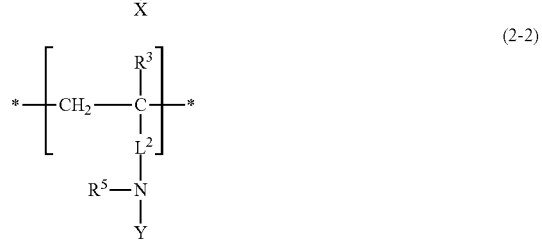

-continued

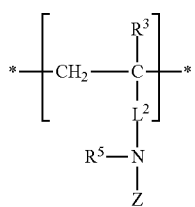
(2-3)

$R^3$ represents a hydrogen atom, a halogen atom, or an alkyl group, $R^5$ represents a hydrogen atom or an alkyl group, $L^2$ represents a single bond, an alkylene group, CO, O, or a combination thereof, X, Y, and Z have the same meaning as above, and

* represents a linking portion between repeating units.

3. The all-solid-state secondary battery according to claim 2, wherein the nitrogen-containing polymer includes repeating units in any one of the combinations below:

A repeating unit of Formula (1-1) and a repeating unit of Formula (1-2),

A repeating unit of Formula (1-1) and a repeating unit of Formula (1-3),

A repeating unit of Formula (1-2) and a repeating unit of Formula (1-3),

A repeating unit of Formula (2-1) and a repeating unit of Formula (2-2)

A repeating unit of Formula (2-1) and a repeating unit of Formula (2-3), and

A repeating unit of Formula (2-2) and a repeating unit of Formula (2-3).

4. The all-solid-state secondary battery according to claim 2, wherein a repeating unit represented by Formula (1-2) above is represented by Formula (1-2I) or (1-2II) below,

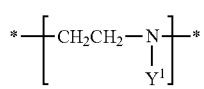
(1-2I)

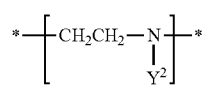
(1-2II)

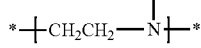

in the formulae, * represents a linking portion between repeating units, $Y^1$ represents a univalent group having a number average molecular weight of 500 to 1,000,000 and having a polyester chain, a polyamide chain, a polyimide chain, a polyacryl chain, a polyether chain, or a polycarbonate chain, and $Y^2$ represents a divalent group having a number average molecular weight of 500 to 1,000,000 and having a polyester chain, polyamide chain, a polyimide chain, a polyacryl chain, a polyether chain, or a polycarbonate chain.

5. The all-solid-state secondary battery according to claim 4, wherein $Y^1$ above is represented by formulae below,

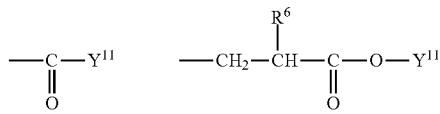

$Y^{11}$ represents any one of a univalent polyether chain, a univalent polyester chain, a univalent polycarbonate chain, and a univalent polyacryl chain, and $R^6$ represents a hydrogen atom or a methyl group.

6. The all-solid-state secondary battery according to claim 4, wherein $Y^2$ above is represented by formulae below,

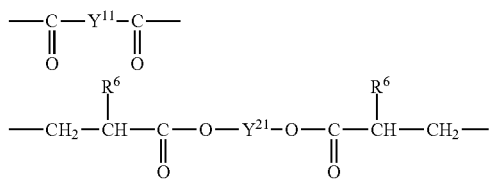

$Y^{21}$ represents any one of a divalent polyether chain, a divalent polyester chain, a divalent polycarbonate chain, and a divalent polyacryl chain, and $R^6$ represents a hydrogen atom or a methyl group.

7. The all-solid-state secondary battery according to claim 2, wherein the repeating unit represented by Formula (2-2) above is represented by Formula (2-2I) or (2-2II) below,

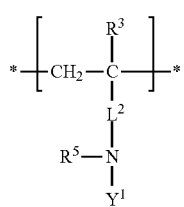
(2-2I)

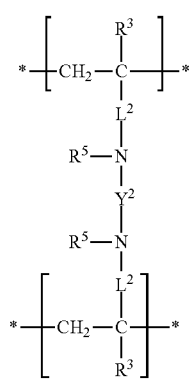
(2-2II)

in the formulae, $R^3$, $R^5$, and $L^2$ represent groups which are the same as above, $Y^1$ represents a univalent group having a number average molecular weight of 500 to 1,000,000 and having a polyester chain, a polyamide chain, a polyimide chain, a polyacryl chain, a polyether chain, or a polycarbonate chain, and $Y^2$ represents a divalent group having a number average molecular weight of 500 to 1,000,000 and having a polyester chain, a polyamide chain, a polyimide chain, a polyacryl chain, a polyether chain, or a polycarbonate chain.

8. The all-solid-state secondary battery according to claim 7,
wherein $Y^1$ above is represented by formulae below,

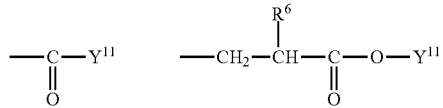

$Y^{11}$ represents any one of a univalent polyether chain, a univalent polyester chain, a univalent polycarbonate chain, and a univalent polyacryl chain, and $R^6$ represents a hydrogen atom or a methyl group.

9. The all-solid-state secondary battery according to claim 1,
wherein Z has a structure represented by $\#\text{-}L^R\text{-}(L^1)_p\text{-}Z^1$,
\# represents a site at which a nitrogen atom included in a base portion of the nitrogen-containing polymer is bonded,
$L^R$ represents an alkylene group having 1 to 12 carbon atoms,
$L^1$ represents CO, $NR^N$, O, or a combination thereof, and p represents 0 or 1,
$R^N$ represents a hydrogen atom or a substituent, and
$Z^1$ represents an alkyl group having 1 to 30 carbon atoms, a halogenated alkyl group having 1 to 30 carbon atoms, or a silicone chain having 1 to 100 silicon atoms.

10. The all-solid-state secondary battery according to claim 1,
wherein the substituent X is a group having a functional group selected from a carboxyl group, a sulfonic acid group, a phosphoric acid group, and —COCH$_2$CO—.

11. The all-solid-state secondary battery according to claim 1,
wherein a number average molecular weight of the substituent Y is 500 to 1,000,000.

12. The all-solid-state secondary battery according to claim 1,
wherein the positive electrode active substance layer, the negative electrode active substance layer, or the inorganic solid electrolyte layer further contains a lithium salt.

13. The all-solid-state secondary battery according to claim 1,
wherein the inorganic solid electrolyte is an oxide-based inorganic solid electrolyte.

14. The all-solid-state secondary battery according to claim 13,
wherein the inorganic solid electrolyte is selected from compounds of formulae below:

$Li_{xa}La_{ya}TiO_3$ xa=0.3 to 0.7 and ya=0.3 to 0.7, $Li_7La_3Zr_2O_{12}$, $Li_{3.5}Zn_{0.25}GeO_4$, $LiTi_2P_3O_{12}$, $Li_{1+xh+yh}(Al,Ga)_{xh}(Ti,Ge)_{2-xh}Si_{yh}P_{3-yh}O_{12}$ $0 \leq xh \leq 1$, $0 \leq yh \leq 1$, $Li_3PO_4$, LiPON, LiPOD$^1$ $D^1$ is at least one selected from Ti, V, Cr, Mn, Fe, Co, Ni, Cu, Zr, Nb, Mo, Ru, Ag, Ta, W, Pt, or Au, and LiA$^1$ON $A^1$ is at least one selected from Si, B, Ge, Al, C, or Ga.

15. A solid electrolyte composition for an inorganic solid electrolyte, comprising:
a nitrogen-containing polymer having at least two selected from the group consisting of a repeating unit having a substituent X, a repeating unit having a substituent Y and a repeating unit having a substituent Z described below and an inorganic solid electrolyte having conductivity of ions of metal belonging to Group 1 or 2 in the periodic table,
wherein X represents a group containing a functional group having a pKa of 14 or less,
Y represents a group having a polymer chain including a hetero atom, and Y may be linked to another nitrogen-containing polymer molecule to form a linking chain, and
Z represents a group having an alkyl group having 1 to 30 carbon atoms, a group having a halogenated alkyl group having 1 to 30 carbon atoms, or a group having a silicone chain having 1 to 100 silicon atoms.

16. The solid electrolyte composition according to claim 15,
wherein 0.1 parts by mass to 20 parts by mass of a nitrogen-containing polymer is contained with respect to 100 parts by mass of the inorganic solid electrolyte.

17. An electrode sheet for batteries,
wherein a film is formed with the solid electrolyte composition according to claim 16, on a metal foil.

18. An electrode sheet for batteries,
wherein a film is formed with the solid electrolyte composition according to claim 15, on a metal foil.

19. A manufacturing method of an electrode sheet for batteries, comprising:
forming a film with the solid electrolyte composition according to claim 15, on a metal foil.

20. A manufacturing method of an all-solid-state secondary battery, comprising:
manufacturing an all-solid-state secondary battery by the manufacturing method according to claim 19.

\* \* \* \* \*